United States Patent
Hashimoto et al.

(10) Patent No.: US 10,906,193 B2
(45) Date of Patent: Feb. 2, 2021

(54) MANUFACTURING SYSTEM, METHOD OF CONSTRUCTING THE MANUFACTURING SYSTEM, END EFFECTOR, ROBOT, AND WORKING METHOD OF ROBOT

(71) Applicant: KAWASAKI JUKOGYO KABUSHIKI KAISHA, Kobe (JP)

(72) Inventors: Yasuhiko Hashimoto, Kobe (JP); Satoru Hibino, Kobe (JP); Hideshi Yamane, Kakogawa (JP); Hiroyuki Mizumoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 401 days.

(21) Appl. No.: 15/776,457

(22) PCT Filed: Mar. 14, 2016

(86) PCT No.: PCT/JP2016/001449
§ 371 (c)(1),
(2) Date: May 16, 2018

(87) PCT Pub. No.: WO2017/085897
PCT Pub. Date: May 26, 2017

(65) Prior Publication Data
US 2018/0370043 A1 Dec. 27, 2018

(30) Foreign Application Priority Data
Nov. 16, 2015 (JP) .................. 2015-223770

(51) Int. Cl.
*B25J 15/08* (2006.01)
*B25J 15/00* (2006.01)
*B25J 15/04* (2006.01)
*B25J 15/06* (2006.01)
(Continued)

(52) U.S. Cl.
CPC ............. *B25J 15/08* (2013.01); *B25J 9/0009* (2013.01); *B25J 9/0084* (2013.01); *B25J 9/0087* (2013.01); *B25J 13/06* (2013.01); *B25J 15/0019* (2013.01); *B25J 15/0057* (2013.01);
(Continued)

(58) Field of Classification Search
CPC ...... B25J 9/0084; B25J 9/0087; B25J 9/1612; B25J 9/1682; B25J 15/0009; B25J 15/0047; B25J 15/0052–0066; B25J 15/0019; B25J 15/0433; B25J 15/0616; B25J 15/0441;
(Continued)

(56) References Cited

U.S. PATENT DOCUMENTS 4,627,785 A  12/1986  Monforte
4,852,242 A *  8/1989  Tella .................. B23Q 3/15506
                                                483/59
(Continued)

FOREIGN PATENT DOCUMENTS

CN  102672547 A  9/2012
CN  103317497 A  9/2013
(Continued)

*Primary Examiner* — Dale Moyer
(74) *Attorney, Agent, or Firm* — Oliff PLC

(57) ABSTRACT

A manufacturing system includes an industrial robot having a robotic arm and a robot hand attached to the robotic arm, and a work station having an instrument provided with a grip to be gripped by the robot hand.

12 Claims, 26 Drawing Sheets

(51) Int. Cl.
    *B25J 9/00* (2006.01)
    *B25J 13/06* (2006.01)
(52) U.S. Cl.
    CPC ....... *B25J 15/0061* (2013.01); *B25J 15/0433* (2013.01); *B25J 15/0616* (2013.01)
(58) Field of Classification Search
    CPC ................ B25J 15/0038; B25J 19/0029; B25J 19/0033; Y10S 483/901
    See application file for complete search history.

(56) References Cited

U.S. PATENT DOCUMENTS

| | | | |
|---|---|---|---|
| 4,913,617 A * | 4/1990 | Nicholson | B25J 9/0084 294/86.4 |
| 7,421,886 B1 * | 9/2008 | Fox | G01M 3/28 403/31 |
| 7,975,645 B2 * | 7/2011 | Umezawa | B25J 9/0084 118/302 |
| 9,643,315 B2 * | 5/2017 | Roethling | B25J 9/161 |
| 2010/0230511 A1 * | 9/2010 | Umezawa | B05B 5/1675 239/104 |
| 2012/0232698 A1 | 9/2012 | Koga et al. | |
| 2013/0245823 A1 | 9/2013 | Kimura et al. | |
| 2013/0338830 A1 * | 12/2013 | Roethling | B25J 9/161 700/257 |
| 2015/0210410 A1 * | 7/2015 | Umeno | A61J 1/16 53/51 |
| 2016/0288322 A1 * | 10/2016 | Lin | B25J 9/163 |
| 2016/0339590 A1 * | 11/2016 | Lin | B25J 15/0061 |
| 2018/0133893 A1 * | 5/2018 | Motojima | B25J 5/02 |
| 2018/0276622 A1 * | 9/2018 | Skiba | H04L 67/42 |

FOREIGN PATENT DOCUMENTS

| | | |
|---|---|---|
| JP | S58-211874 A | 12/1983 |
| JP | H07-227788 A | 8/1995 |
| JP | 2007-185746 A | 7/2007 |
| JP | 2007-307628 A | 11/2007 |
| JP | 2009-184099 A | 8/2009 |
| JP | 2010-269419 A | 12/2010 |
| JP | 2012-035391 A | 2/2012 |
| JP | 2012-187663 A | 10/2012 |
| JP | 2015-044267 A | 3/2015 |

* cited by examiner

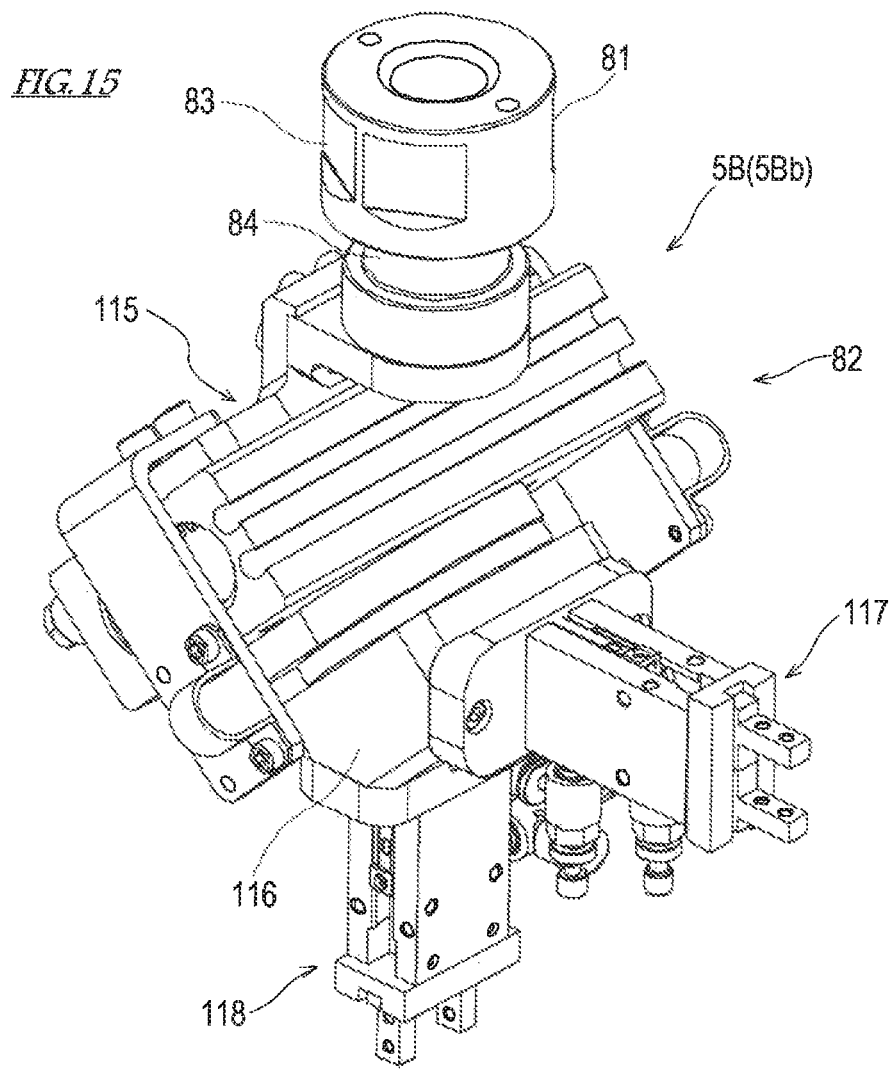

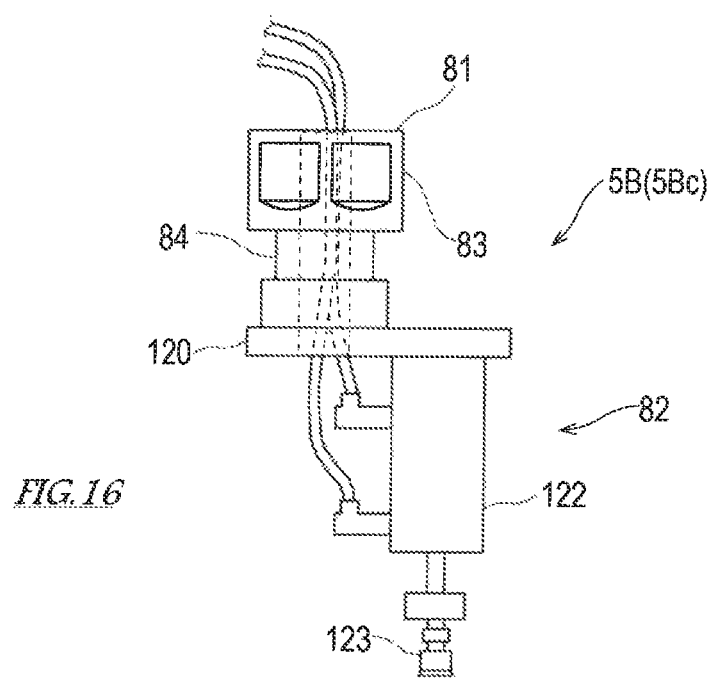

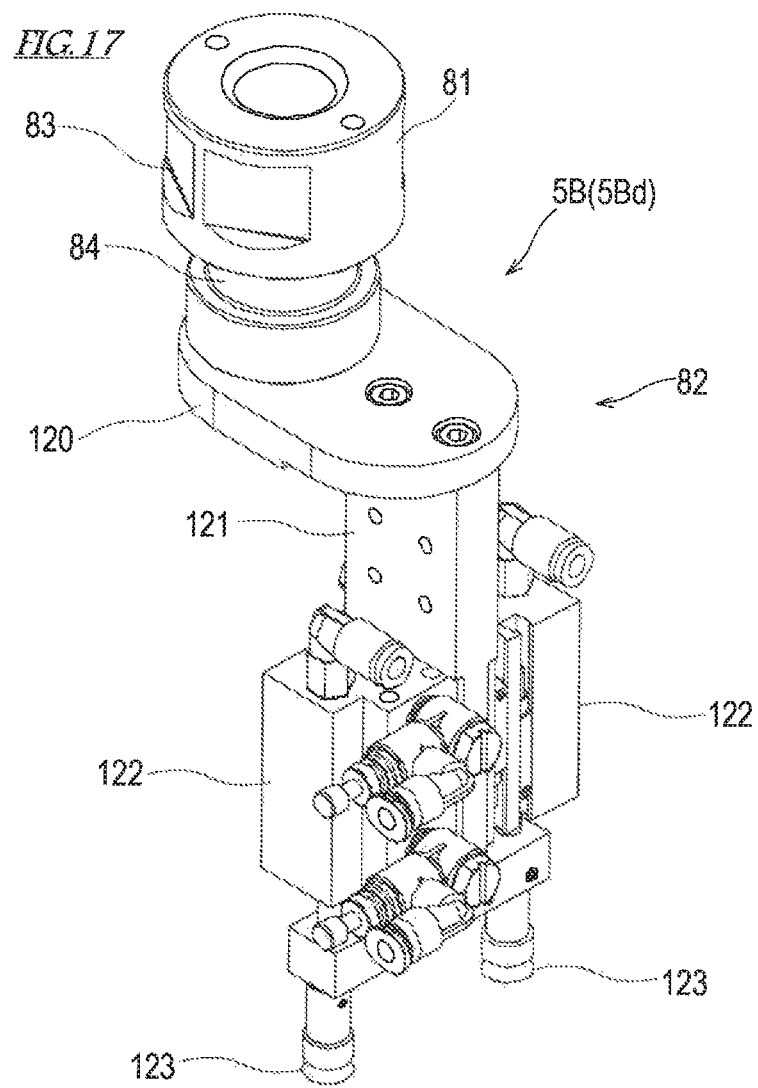

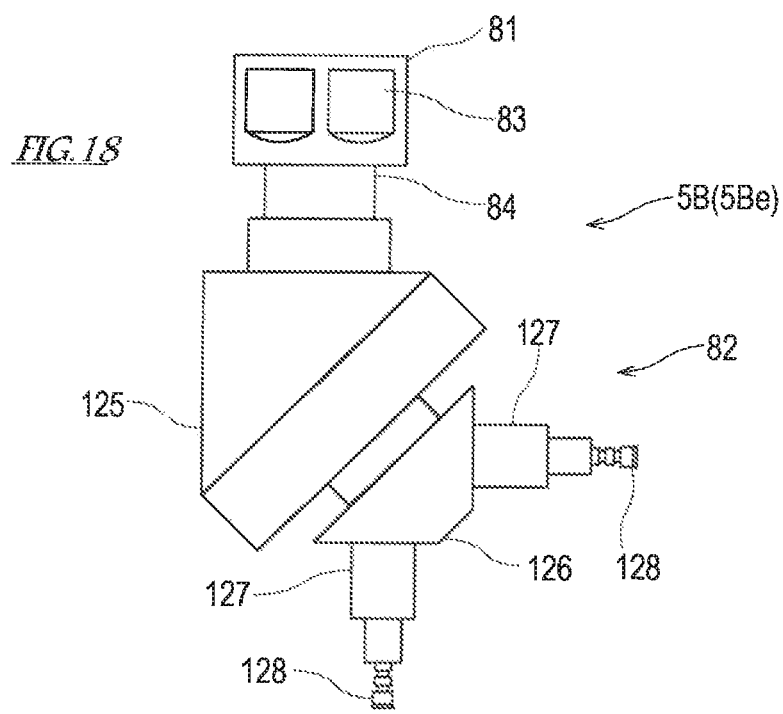
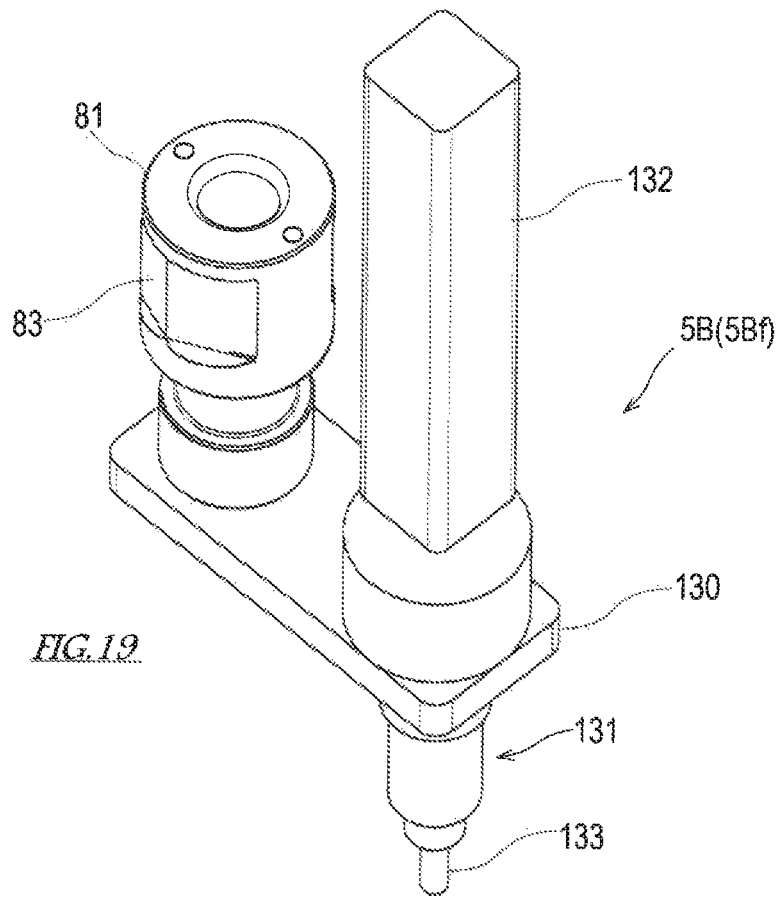

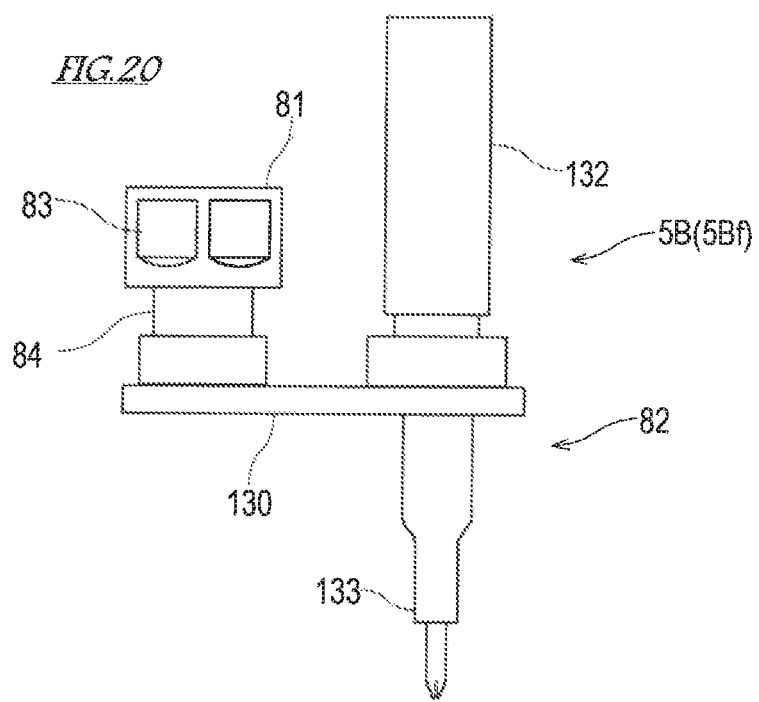

MANUFACTURING SYSTEM, METHOD OF CONSTRUCTING THE MANUFACTURING SYSTEM, END EFFECTOR, ROBOT, AND WORKING METHOD OF ROBOT

TECHNICAL FIELD

The present disclosure relates to a manufacturing system which uses an industrial robot and a method of constructing the manufacturing system, an end effector suitable for the manufacturing system, a robot provided with the end effector, and a working method of the robot.

BACKGROUND ART

As one of sales types of robots, there is a lease. For example, in Patent Document 1, a sales system of a service robot including a lease is disclosed.

In the service robot sales system of Patent Document 1, the service robot is comprised of an interior structure including various detecting means, drive systems, etc. and an exterior structure which surrounds the interior structure, and is provided to a user with the interior structure being a lease and the exterior structure being custom-made.

Generally, the service robot as described above is a robot used within a field of a service industry, such as a guidance robot, a receptionist robot, a dialog robot, and a cleaning robot. In contrast with the service robot, there is an industrial robot which mainly performs a work instead of a human in a manufacturing process of automobiles or electronic components. Generally, the industrial robot includes a robotic arm and an end effector attached to a wrist part of the robotic arm. This end effector has a function corresponding to the manufacturing process where the robot is used.

Meanwhile, in order to have versatility, an industrial robot in which the wrist part of the robotic arm is provided with an automatic tool changer, and a tool attached to the wrist part of the robotic arm is automatically changed is known. Patent Document 2 discloses this kind of industrial robot.

In the industrial robot disclosed in Patent Document 2, a wrist part of the robot is provided with a robot-side tool changer, and each tool, such as a spot-welding gun or a handling tool, is provided with a tool-side tool changer. In this industrial robot, by operation of the robot, an automatic change of the tool is performed by releasing the coupling of the robot-side tool changer and the tool-side tool changer, and coupling the robot-side tool changer to the tool-side tool changer of another tool.

REFERENCE DOCUMENTS OF CONVENTIONAL ART

Patent Documents

[Patent Document 1] JP2007-307628A
[Patent Document 2] JP2009-184099A

DESCRIPTION OF THE DISCLOSURE

Problems to be Solved by the Disclosure

Although Patent Document 1 discloses the lease of the service robot, a lease of the industrial robot is not so easy as the lease of the service robot. As for the industrial robot, since the function required for the end effector differs for every user and the exclusive-use nature is high, it is difficult to industrially manufacture (i.e., to mass-produce) the end effectors. Further, normally, the industrial robot once installed at a manufacturing site performs the work over a long period of time in a severe environment. Based on these factors, the lease of the industrial robot is expected to require the same cost as the purchase and, thus, it has been thought that the industrial robot is not suitable for lease.

Moreover, the present inventors have proposed a manufacturing system in which one work station (the work station includes a work cell) is shared by a worker and a plurality of robots. In this manufacturing system, one work station is shared by a worker and first to n-th robots (n is an integer), any one of these can use the work station by turns. In order to realize this system, the robot requires versatility, but if the robot-side tool changer like Patent Document 1 is therefor provided to each robot, it will not be realistic due to a large cost. Moreover, the conventional tool-side tool changer is an interface which corresponds to the robot-side tool changer, and it is difficult for the worker to use the tool provided with the conventional tool-side tool changer as it is. Therefore, since both the tool for the robot and the tool for the worker are required at the work station in order for the robot and the worker to share one work station, the space is oppressed and the cost increases as well.

The present disclosure is made in view of the situations described above, and as the purpose of suppressing an introducing cost of the manufacturing system which uses an industrial robot, provides a manufacturing system using the industrial robot and a method of constructing the manufacturing system, and an end effector suitable for the manufacturing system, a robot provided with the end effector, and a working method of the robot.

SUMMARY OF THE DISCLOSURE

A manufacturing system according to an aspect of the present disclosure includes an industrial robot having a robotic arm and a robot hand attached to the robotic arm, and a work station having an instrument provided with a grip to be gripped by the robot hand.

Further, a method of constructing a manufacturing system according to another aspect of the present disclosure includes the steps of forming a work station provided with an instrument having a grip and a base configured to support the instrument, acquiring by lease or purchase an industrial robot provided with a robot hand configured to grip the grip and a robotic arm to which the robot hand is attached, and introducing the robot into the work station.

Further, an end effector according to another aspect of the present disclosure is an end effector to be attached to a wrist part of a robotic arm, which includes a robot hand to be coupled to the wrist part, a grip to be gripped by the robot hand and a worker, and an instrument having a functional part coupled to the grip.

Further, a robot according to another aspect of the present disclosure includes a robotic arm, the end effector attached to the wrist part of the robotic arm, and a robot control device configured to control operation of the robotic arm and the end effector.

Further, a working method of a robot according to another aspect of the present disclosure is a working method of an industrial robot provided with a robotic arm and a robot hand attached to the robotic arm, by using an instrument having a grip gripped by a worker, which includes the steps of operating the robotic arm and the robot hand to grip the grip of the instrument by the robot hand, and operating the robotic arm and the instrument while maintaining the gripping of the grip of the instrument by the robot hand to act the instrument on an object.

According to the manufacturing system and the method of constructing the manufacturing system, and the end effector suitable for the manufacturing system, the robot provided with the end effector, and the working method of the robot, by the robot gripping the grip of the instrument by the robot hand, the robot hand and the instrument are integrated. By the instrument integrated with the robot hand, the function of the robot hand is extended or added.

The grip is to be gripped by the robot hand, and in the jointing part of the robot hand and the grip, the connections of the wiring and piping on the robot side and the instrument side are not required. Thus, the grip is possible to be manufactured at an economical price. Therefore, the user can acquire the plurality of instruments with the grips having the common form at comparatively low cost. Further, since the robot hand which performs the gripping operation is high in versatility, the user can acquire the robot at low cost as compared with the case where the robot hand of high exclusive-use nature is provided. Therefore, the introducing cost of the manufacturing system using the industrial robot is reduced.

Effect of the Disclosure

According to the present disclosure, the introducing cost of the manufacturing system using the industrial robot is suppressed.

BRIEF DESCRIPTION OF DRAWINGS

FIG. 15 is a perspective view illustrating a double rotary chuck type extended hand.

FIG. 16 is a side view illustrating a single adsorption type extended hand.

FIG. 17 is a perspective view illustrating a double adsorption type extended hand.

FIG. 18 is a side view illustrating a double rotary adsorption type extended hand.

FIG. 19 is a perspective view of the end effector provided with a screwdriver type extended hand.

FIG. 20 is a side view of the screwdriver type extended hand of FIG. 19.

MODES FOR CARRYING OUT THE DISCLOSURE

Hereinafter, one embodiment of the present disclosure is described with reference to the drawings. An industrial robot according to one embodiment of the present disclosure (hereinafter, simply referred to as "the robot 1") is, for example, used at a production facility where electric and/or electronic components etc. are assembled to manufacture a product by a line production method or a cell production method. In this production facility, a work station 2 for the robot 1 and a worker are comprised of at least one instrument and a base (a stand or a table) which supports the instrument. Note that, in this specification and the claims, a work cell may be included in what is expressed as "the work station."

[Work Station 2]

First, the outline of the work station 2 is described.

Figure 1:
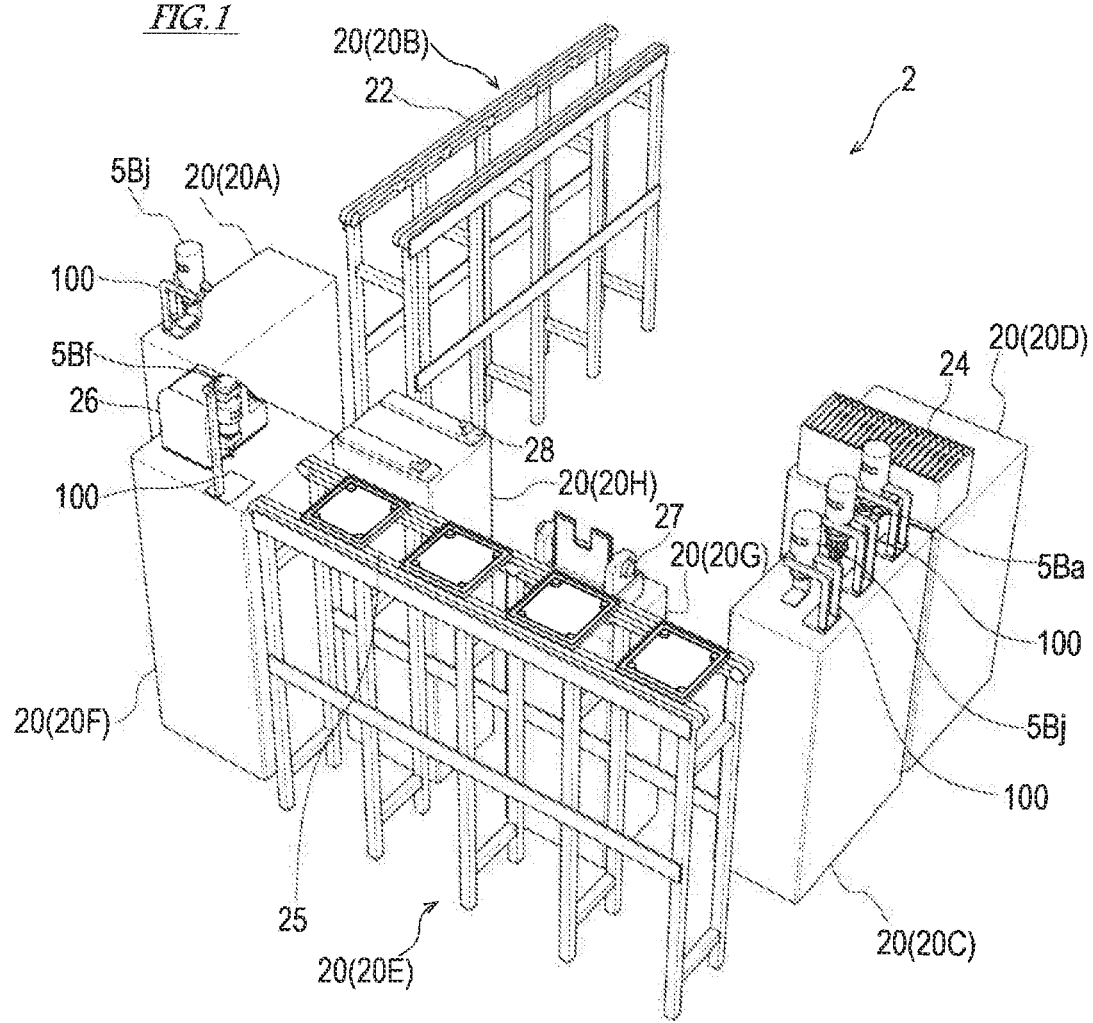
FIG. 1 is a view illustrating one example of a work station according to one embodiment of the present disclosure.
Figure 2:
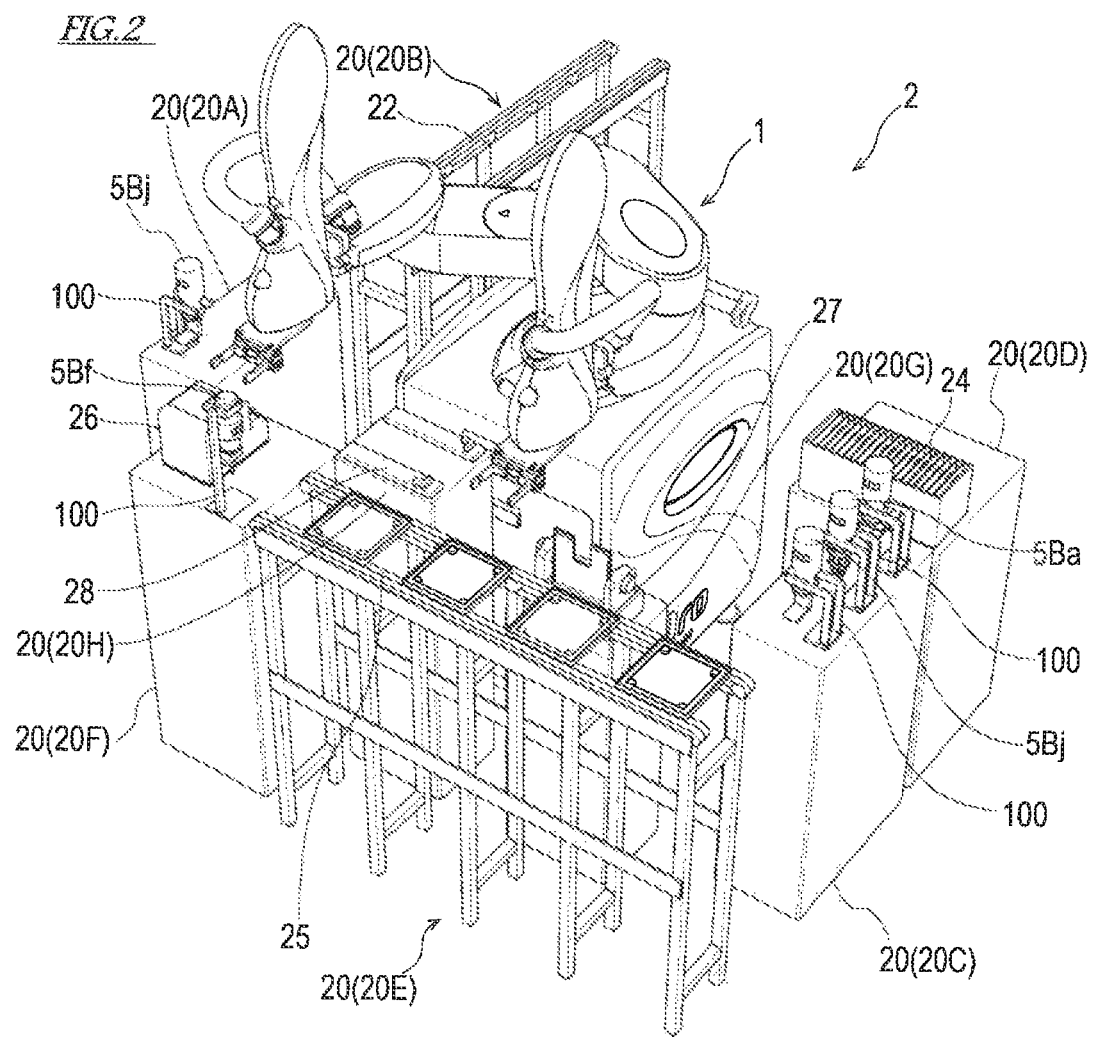
FIG. 2 is a view illustrating a situation in which a robot is working at the work station of FIG. 1.
Figure 3:
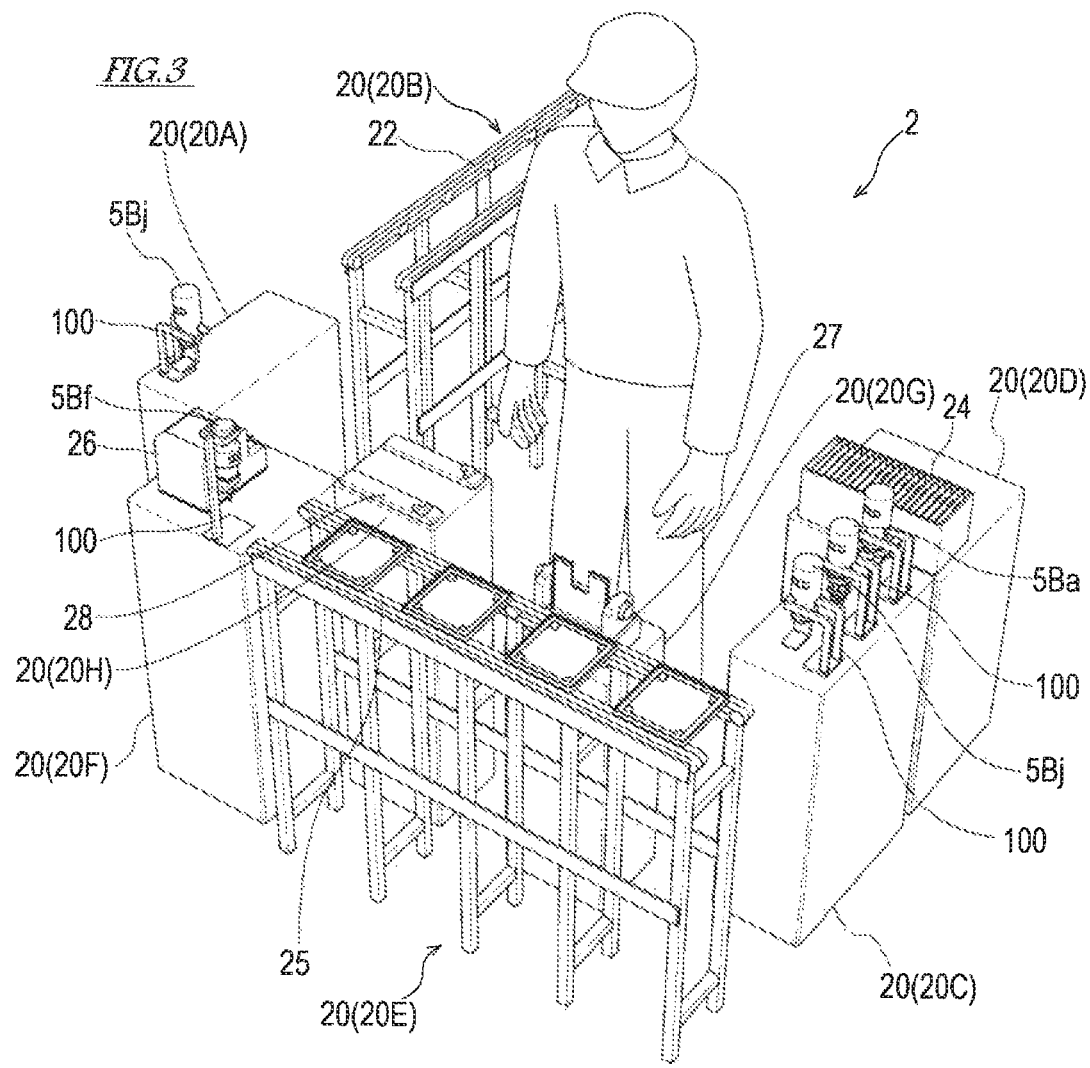
FIG. 3 is a view illustrating a situation in which a worker is working at the work station of FIG. 1.

One example of the work station 2 comprised of a plurality of bases 20 is illustrated in FIG. 1, a situation in which the robot 1 is working at this work station 2 is illustrated in FIG. 2, and a situation in which the worker is working at this work station 2 is illustrated in FIG. 3. At this work station 2, works, such as a transfer of a substrate, a posture conversion of a component, an assembly of the component to the substrate, etc. are performed. Note that the work performed at the work station 2 is not limited to these works, but may be at least one of various works, such as a transfer, a posture conversion, an assembly, welding, painting, inspection, etc. to a workpiece or a component.

As illustrated in FIGS. 1-3, a plurality of bases 20 are installed at the work station 2 according to this embodiment. On the right side when viewed from the robot 1 (or the worker) introduced into the work station 2, a base 20A in which a rack 100 for supporting an extended hand 5B (described later) is provided and a base 20B provided with a conveyor 22 for taking out a substrate, are installed. On the left side when viewed from the robot 1 (or the worker), a base 20C provided with a plurality of racks 100 for supporting extended hands 5B and a base 20D provided with a box 24 which accommodates plate-like components to be assembled to the substrate in a vertical posture are installed. Moreover, at the front when viewed from the robot 1 (or the worker), a base 20E provided with a conveyor 25 for carrying in the substrate, a base 20F provided with a screw feeding device 26 which supplies screws for assembling the component(s) to the substrate and a rack 100 for supporting an extended hand 5B, a base 20G provided with a posture converting device 27 which converts the posture of the plate-like component from the vertical posture to a horizontal posture, and a base 20H provided with a jig 28 which holds the position of the substrate when assembling the component to the substrate are provided. Note that the structures and the arrangements of these bases 20 are not limited, and at least one base 20 according to the work performed at the work station 2 is installed.

As described above, by the bases 20 (20A-20H) arranged in a gate shape when viewed from the robot 1, the work station 2 is formed, and introducing positions of the robot 1 and the worker at the work station 2 are defined. Note that the arrangement of the bases 20 (20A-20H) is not limited to the gate shape, but may be an L-shape, an I-shape, etc. This work station 2 may be shared by the robot 1 and the worker. Moreover, this work station 2 may be shared by a plurality of robots 1. The plurality of robots 1 which share the work station 2 may have different mechanisms, as long as they are capable of attaching a base hand 5A (described later) thereto. Note that "sharing the work station 2" as used herein refers to using one work station 2 by sharing persons.

[Robot 1]

Next, a structure of the robot 1 is described.

Figure 4:
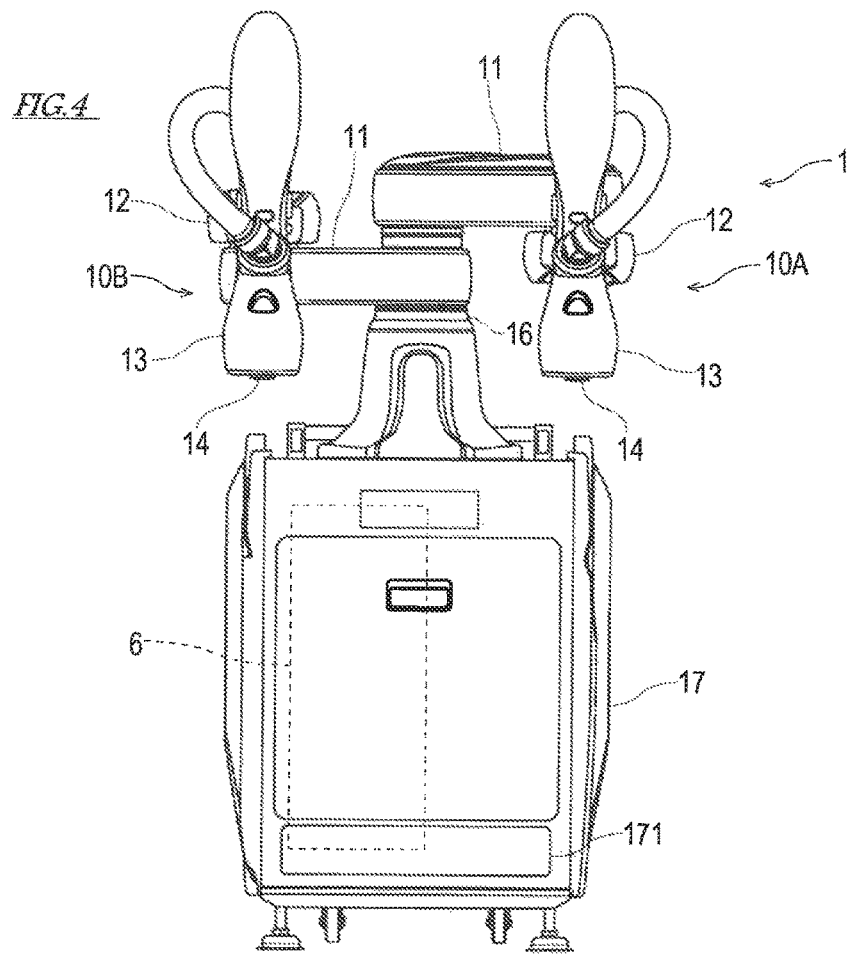
FIG. 4 is a view illustrating an outline structure of the industrial robot according to one embodiment of the present disclosure.
Figure 5:
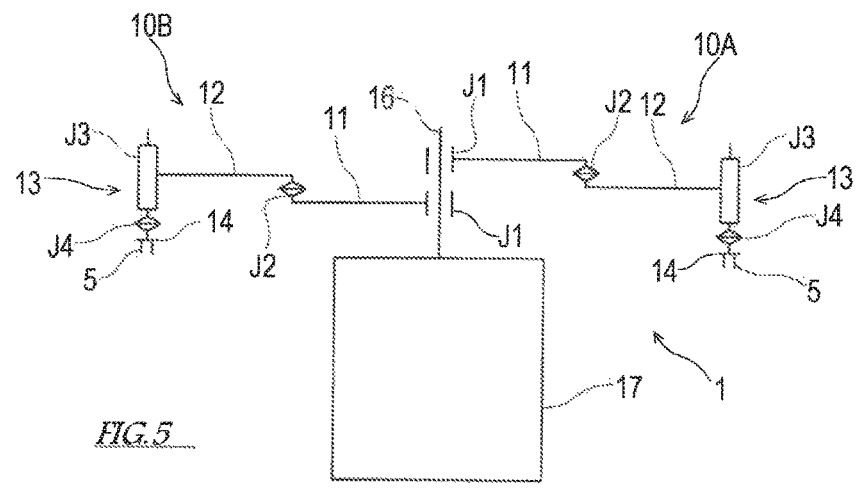
FIG. 5 is a view illustrating a link structure of a robotic arm of the robot illustrated in FIG. 4.

FIG. 4 is a perspective view illustrating an outline structure of the robot 1 according to this embodiment, and FIG. 5 is a view illustrating a link structure of a robotic arm 10 of the robot 1 illustrated in FIG. 4. As illustrated in FIGS. 4 and 5, the robot 1 according to this embodiment is a dual-arm horizontal articulated robot provided with left and right robotic arms (hereinafter, simply referred to as "the arm(s)") 10A and 10B. The left and right arms 10A and 10B are capable of operating independently, or operating related to each other. Note that the robot 1 to which the present disclosure is applicable is not limited to this embodiment, but may be an industrial robot provided with at least one robotic arm regardless of the horizontal articulated type or the vertical articulated type.

The robot 1 includes a hand cart 17 and the pair of arms 10A and 10B supported by the hand cart 17. An end effector 5 is attached to a wrist part 13 of each of the arms 10A and 10B. Note that the end effector 5 is omitted in FIG. 4. Moreover, operations of the arms 10A and 10B and the end effector 5 are controlled by a robot control device 6 disposed in the hand cart 17. An interface 171 where connectors of piping and wiring (not illustrated) are arranged is provided to a front surface of the hand cart 17.

The left and right arms 10A and 10B have substantially similar structures and, thus, when not distinguishing the left and right arms 10A and 10B in particular, they are expressed as "the arm(s) 10," while omitting the alphabet of the suffix. Each arm 10 includes a first link 11, a second link 12, and the wrist part 13 having a mechanical interface 14 to which the end effector 5 is attached, and these are serially coupled.

The first link 11 is coupled by a revolute joint J1 to a base shaft 16 fixed to the upper surface of the hand cart 17. The first link 11 is rotatable on a vertical rotational axis which passes through the axial center of the base shaft 16. Moreover, the second link 12 is coupled by a revolute joint J2 to a tip end of the first link 11. The second link 12 is rotatable on a vertical rotational axis defined at the tip end of the first link 11.

The wrist part 13 is coupled through a prismatic joint J3 and a revolute joint J4 to a tip end of the second link 12. The wrist part 13 is capable of moving up and down with respect to the second link 12 by the prismatic joint J3. Moreover, the wrist part 13 is rotatable on a vertical rotational axis with respect to the second link 12 by the revolute joint J4.

The arm 10 having the structure described above has four control axes which are provided corresponding to the joints J1-J4, respectively. The arm 10 is provided with driving servo motors, encoders which detect rotation angles of the servo motors, and power transmission mechanisms which transmit motive forces of the servo motors to the joints (none of them is illustrated), so as to be associated with the control axes, respectively. Each servo motor is servo-controlled by the robot control device 6 so that the wrist part 13 of the arm 10 moves along a taught route.

Figure 6:
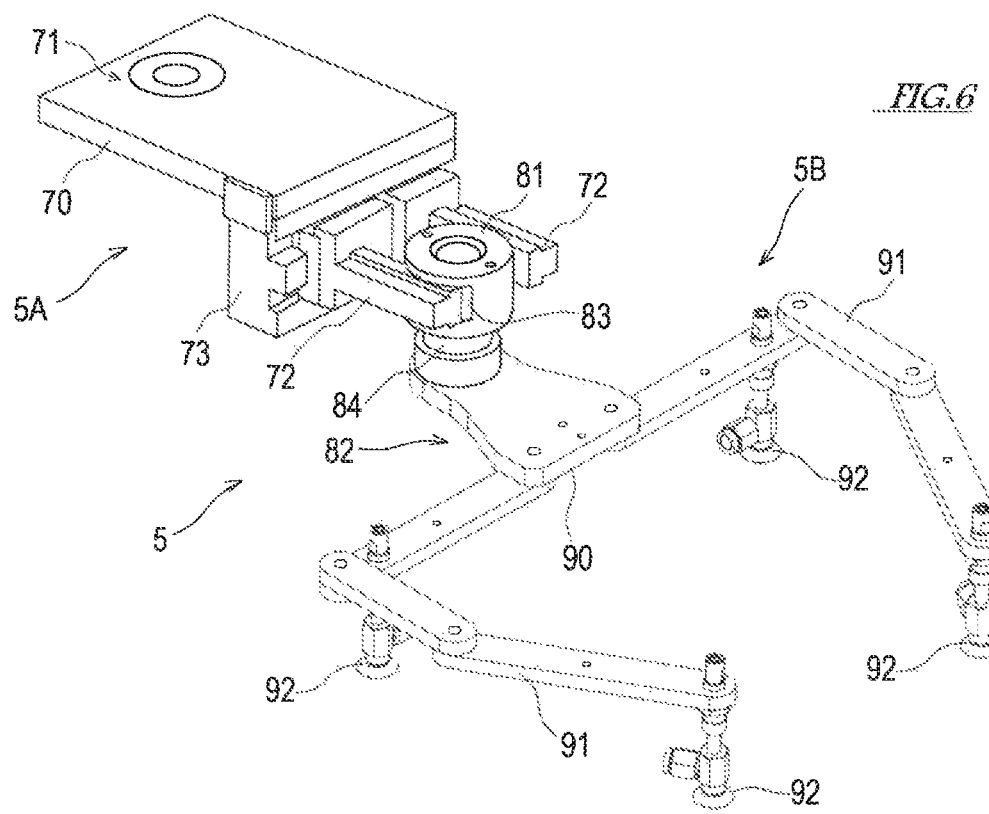
FIG. 6 is a perspective view of an end effector according to one embodiment of the present disclosure.
Figure 7:
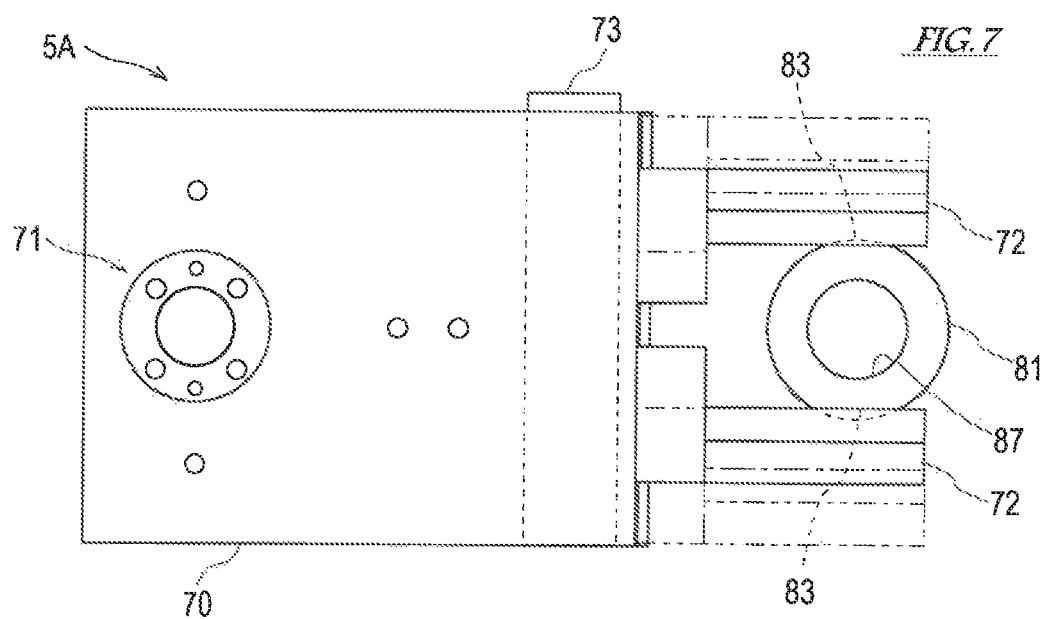
FIG. 7 is a plan view of a base hand and a grip of an extended hand gripped by the base hand.
Figure 8A:
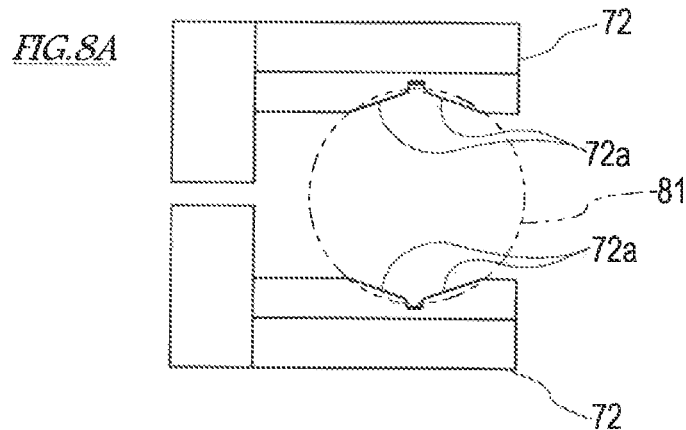
FIG. 8A is a plan view of grip fingers according to this embodiment.
Figure 8B:
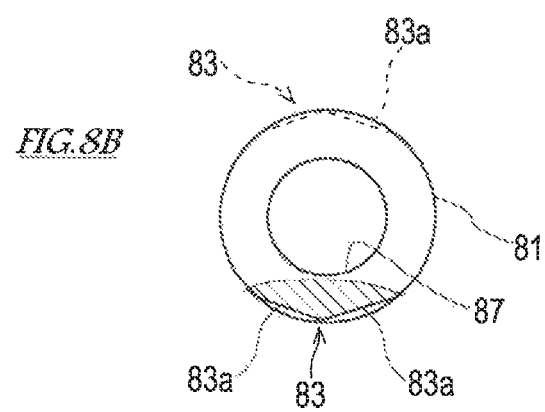
FIG. 8B is a plan view of the grip of the extended hand corresponding to the grip fingers illustrated in FIG. 8A.
Figure 9A:
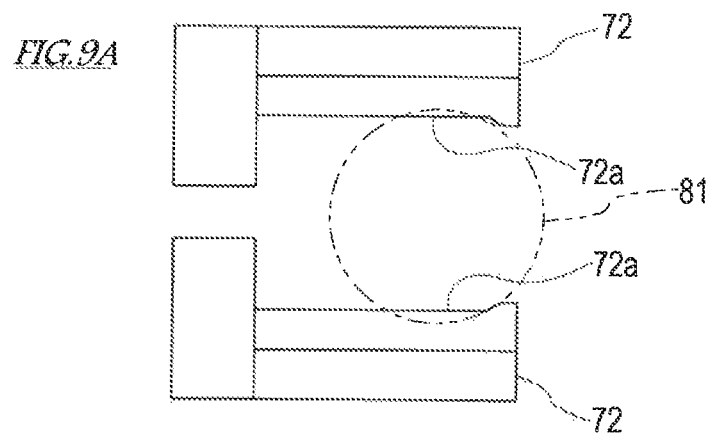
FIG. 9A is a plan view of grip fingers according to a modification.
Figure 9B:
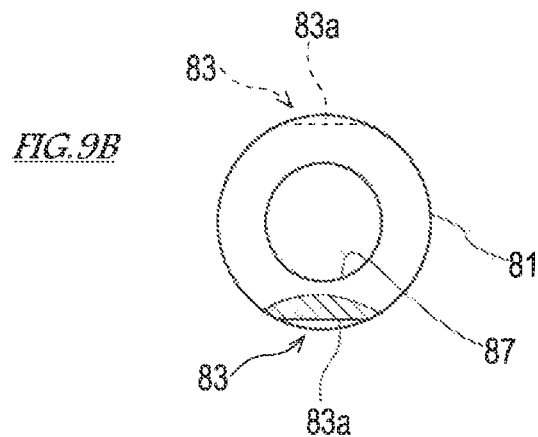
FIG. 9B is a plan view of a grip of an extended hand corresponding to the grip fingers illustrated in FIG. 9A.
Figure 10:
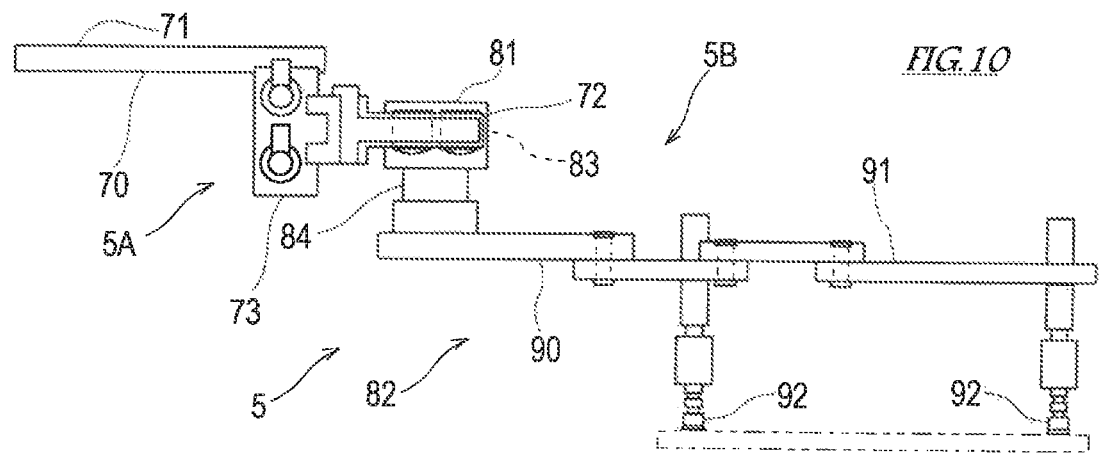
FIG. 10 is a side view of the end effector illustrating in FIG. 6.
Figure 11:
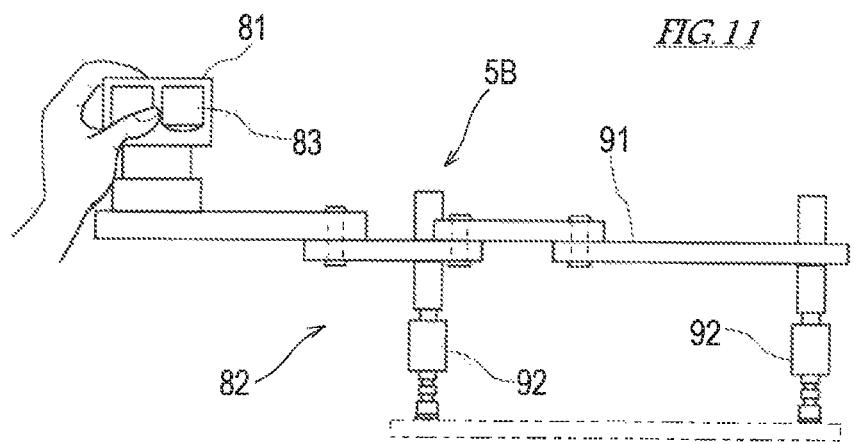
FIG. 11 is a side view illustrating a situation in which the worker is gripping the extended hand of the end effector illustrated in FIG. 6.

Here, the end effector 5 attached to the wrist part 13 of the arm 10 is described in detail. FIG. 6 is a perspective view of the end effector 5 according to one embodiment of the present disclosure, FIG. 7 is a plan view of the base hand 5A and a grip 81 of the extended hand 5B gripped by the base hand 5A. FIG. 10 is a side view of the end effector 5 illustrated in FIG. 6, and FIG. 11 is a side view illustrating a situation in which the worker is gripping the extended hand 5B of the end effector 5 illustrated in FIG. 6.

As illustrated in FIGS. 6 to 11, the end effector 5 is comprised of the base hand 5A and the extended hand 5B.

The base hand 5A is a robot hand which is capable of gripping an object. The base hand 5A according to this embodiment is a gripper-type hand provided with a pair of grip fingers 72, and grips the object by translating the pair of grip fingers 72 closer to each other while maintaining the mutual parallelism.

The base hand 5A according to this embodiment includes a platform 70, an actuator 73 supported by the platform 70, and the pair of grip fingers 72 driven by the actuator 73.

The platform 70 is provided with a robot interface 71. This robot interface 71 is coupled to the mechanical interface 14 provided to the wrist part 13 of the arm 10. Although the platform 70 according to this embodiment is a flat-plate shape, the form of the platform 70 is not limited to this shape.

The pair of grip fingers 72 are driven by the actuator 73, and translate so that they mutually approach and separate while maintaining their parallelism. The actuator 73 is comprised of a combination of a linear guide and a drive source. The linear guide according to this embodiment is comprised of a slide block and a rail, and its drive source is an air cylinder. Note that the actuator 73 is not limited to this embodiment, but, for example, may use a motor or a hydraulic cylinder as the drive source, or may use a rack and a pinion, a cylinder, etc. as the linear guide.

The extended hand 5B is connected to the base hand 5A and extends or changes the function which the base hand 5A has. The extended hand 5B includes the grip 81 and a functional part 82 coupled to the grip 81.

The grip 81 is a part to be joined, of the extended hands 5B, which is joined to the base hand 5A. The base hand 5A grips the grip 81 to integrally join the base hand 5A and the extended hand 5B. Moreover, the jointing of the base hand 5A and the extended hand 5B is canceled by the base hand 5A releasing the grip 81.

The grip 81 presents a hollow or non-hollow cylindrical contour shape. Below, the extending direction of the axial center of the hollow or non-hollow cylinder is referred to as "the axial center direction." The grip 81 according to this embodiment presents a hollow cylindrical shape where a neck part 84 is formed at an intermediate location in the axial center directions, and an inner circumference of the cylinder is a guide part 87 for wiring and piping connected with the functional part 82. By regulating the route of wiring and piping with this guide part 87, when the grip 81 is joined to the base hand 5A, it prevents that the wiring and piping are caught between the base hand 5A and the grip 81. The guide part 87 may be constructed in various structures which is capable of regulating the route of wiring and piping. For example, a bracket different from the grip 81 may be used as the guide part 87, and this bracket may be provided at a position distant from the grip 81. In other words, the guide part 87 may be constructed so that the wiring and piping are isolated from the part at which the base hand 5A and the grip 81 are joined.

An engaging part 83 with which the grip fingers 72 of the base hand 5A engage is provided to an outer circumferential surface of the grip 81. This engaging part 83 corresponds to the number, position, and shape of the grip fingers 72 of the base hand 5A. The base hand 5A according to this embodiment has the pair of grip fingers 72, and the engaging part 83 corresponding to the pair of grip fingers 72 is a groove formed in the outer circumferential surface of the grip 81. The groove is symmetrically provided via the axial center of the grip 81. A groove width of the groove of the engaging part 83 is a groove width into which the grip fingers 72 fit, and is the same as or slightly larger than the width (thickness) of the grip fingers 72.

In this embodiment, a concavo-convex shape is formed in each of the opposing surfaces of the pair of grip fingers 72, and a concavo-convex shape which fits into/onto the concavo-convex shape is formed by the groove which extends in the tangential directions on the outer circumferential surface of the grip 81. If the grip fingers 72 of the base hand 5A are used as a jointing part, a joint receiving part corresponding to the jointing part is the grip 81, or if the concavo-convex shape of the grip fingers 72 is used as the jointing part in a narrow sense, the joint receiving part in the narrow sense corresponding to the jointing part is the concavo-convex shape of the engaging part 83 of the grip 81. For example, as illustrated enlarged in FIGS. 8A and 8B, the grip finger 72 is notched in a triangular shape, and if jointing part 72a having two surfaces is formed in the opposing surfaces of the grip fingers 72, a joint receiving part 83a having two surfaces corresponding to the jointing part 72a is formed in the engaging part 83 of the grip 81. Here, the joint receiving part 83a having two surfaces is comprised of a bottom surface having two grooves which extend in the circumferential directions in the outer circumferential surface of the grip 81. Moreover, for example, as illustrated enlarged in FIGS. 9A and 9B, if the jointing part 72a having one surface is formed in the opposing surfaces of the grip fingers 72, the joint receiving part 83a having one surface corresponding to the jointing part 72a is formed in the engaging part 83 of the grip 81. Here, the joint receiving part 83a having two surfaces is comprised of a bottom surface having one groove which extends in the circumferential directions in the outer circumferential surface of the grip 81.

The grip fingers 72 are fitted into the grooves of the engaging parts 83 in a state where the grip 81 is gripped by the grip fingers 72 of the base hand 5A. That is, the pair of grip fingers 72 become in a state as if they bite into the outer circumferential surface of the grip 81. Thus, the position in the axial center directions and the rotational phase of the grip 81 are positioned with respect to the grip fingers 72 (i.e., the base hand 5A), and the grip 81 is maintained its position so that it does not move from the positioned state relatively to the base hand 5A.

The outer diameter of the grip 81 is 30 to 50 mm. The grip 81 having such a dimension is easy for the worker to grip. Moreover, the engaging parts 83 formed in the outer circumferential surface of the grip 81 also engage with fingers of the worker who grips the grip 81. Thus, by the worker's fingers engage with the engaging parts 83 of the grip 81, the worker's fingers become difficult to slip on the outer circumferential surface of the grip 81 and, thus, the worker is able to stably grip the extended hand 5B.

The extended hand 5B illustrated in FIGS. 6, 10, and 11 is a four-point adsorption type hand, and the functional part 82 of this extended hand 5B is provided with adsorption pads 92 provided at four locations. Note that the four-point adsorption type hand is only one example of the extended hand 5B as will be described later.

The four-point adsorption type hand as an extended hand 5B includes the grip 81, a base plate 90 coupled to the grip 81, two arm members 91 supported by the base plate 90, and two adsorption pads 92 provided to each arm member 91. Each arm member 91 is comprised of three links which are serially coupled. Bottom ends of all the adsorption pads 92 are at the same height. In such a four-point adsorption type hand, for example, in order to handle the plate-like object, four locations in a circumferential edge of the object can be adsorbed by the adsorption pads 92.

Figure 12:
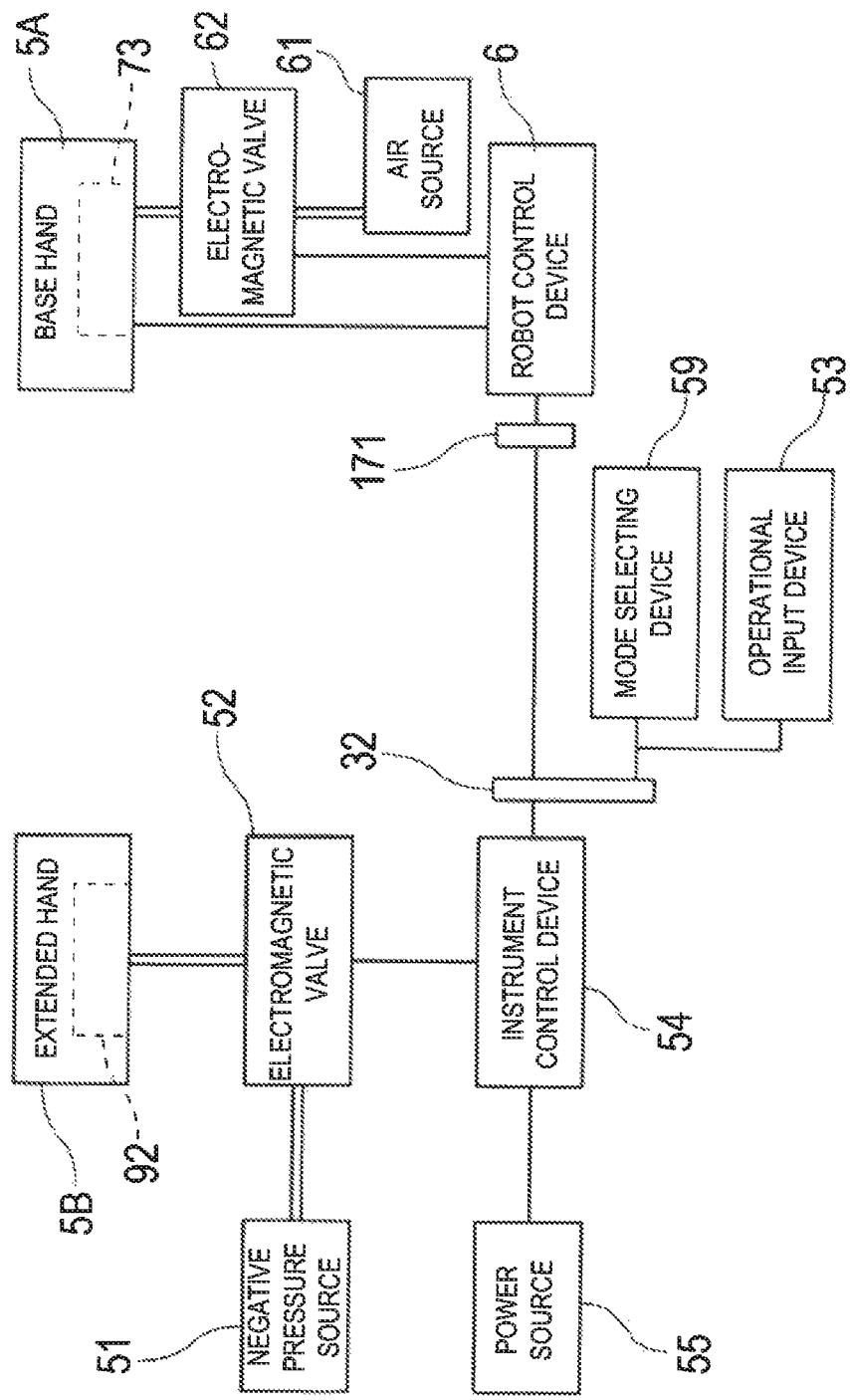
FIG. 12 is a conceptual diagram of a piping system and a wiring system of the industrial robot.
Figure 13:
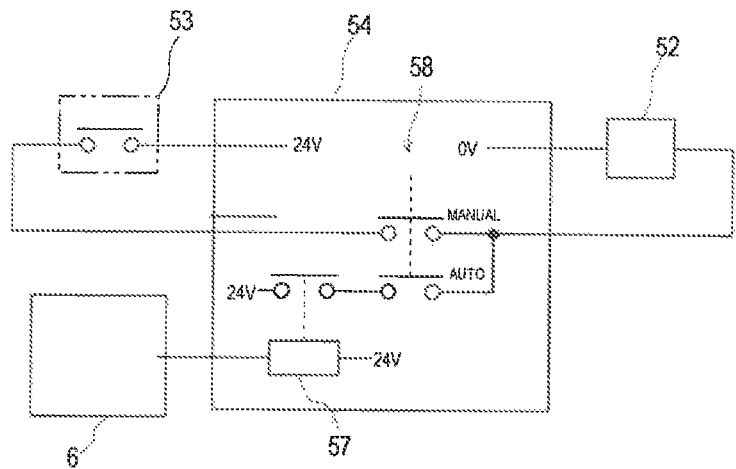
FIG. 13 is a view illustrating a configuration of the wiring system of the industrial robot.

Next, a structure of piping and wiring system of the robot 1 having the structure described above is described. FIG. 12 is a conceptual diagram of the piping system and the wiring system of the robot 1, and FIG. 13 is a block view illustrating the configuration of the wiring system of the robot 1.

As illustrated in FIG. 12, the actuator 73 of the base hand 5A includes, for example, an air cylinder which operates the grip fingers 72, and this air cylinder is connected with an air source 61 through an electromagnetic valve 62 and piping. Operation of the electromagnetic valve 62 is controlled by the robot control device 6, and the gripping operation and the releasing operation of the base hand 5A are controlled by the robot control device 6.

Moreover, the adsorption pads 92 of the extended hand 5B are connected with a negative pressure source 51 through an electromagnetic valve 52 and piping. The electromagnetic valve 52 is, for example, a solenoid actuator, and is mounted to the extended hand 5B, or is disposed near the extended hand 5B as an attachment element of the extended hand 5B without being mounted to the extended hand 5B. Alternatively, the electromagnetic valve 52 may be disposed at a position distant from the extended hand 5B. When the electromagnetic valve 52 is released, the adsorption pads 92 and the negative pressure source 51 are connected by the piping, and an absorption force can be generated at tip ends of the adsorption pads 92.

The electromagnetic valve 52 is electrically connected with an instrument control device 54 which controls operation of at least one instrument provided at the work station 2. Although the instrument control device 54 is illustrated as a controlling means for controlling operation of the extended hand 5B in FIG. 12, the instrument control device 54 may be configured to control operation of instruments other than extended hand 5B, such as the conveyors 22 and 25 and the screw feeding device 26, additionally or alternatively to the extended hand 5B. Moreover, if only the robot 1 works at the work station 2, the robot control device 6 may additionally be provided with the function of the instrument control device 54.

The instrument control device 54 is electrically connected with an operational input device 53, a mode selecting device 59, and the robot control device 6 through the interface 32 and wiring. The interface 32 may be, for example, provided to an external surface of the base 20.

An instruction of adsorption/release of the adsorption pads 92 is inputted into the operational input device 53 from the worker. The operational input device 53 outputs an instruction signal of adsorption (ON)/release (OFF) to the electromagnetic valve 52 based on the instruction. The operational input device 53 may be, for example, a foot switch, a button switch provided to the grip 81 of the extended hand 5B, or a lever switch provided to the grip 81 of the extended hand 5B so that the worker is able to carry out the input operation while gripping the grip 81 of the extended hand 5B.

Selection instructions of the automatic mode and the manual mode are inputted into the mode selecting device 59 from the worker. The mode selecting device 59 outputs an instruction signal of automatic mode (ON)/manual mode (OFF) based on the instruction.

As illustrated in FIG. 13, the instrument control device 54 includes a mode changeover switch 58 which electrically connects one of the operational input device 53 and the robot control device 6 selectively with the electromagnetic valve 52 based on the instruction signal inputted from the mode selecting device 59. In the manual mode, the mode changeover switch 58 is switched so that the electromagnetic valve 52 and the operational input device 53 are electrically connected. That is, in the manual mode, the electromagnetic valve 52 operates based on the operation which is inputted into the operational input device 53 from the worker. Moreover, in the automatic mode, the mode changeover switch 58 is switched so that the electromagnetic valve 52 and the robot control device 6 are electrically connected through a relay 57. That is, in the automatic mode, the electromagnetic valve 52 operates based on the operational signal inputted from the robot control device 6.

Table 1 illustrates relations between output signals of the operational input device 53, the mode selecting device 59, and the robot control device 6, and opening and closing of the electromagnetic valve 52. In the manual mode, the electromagnetic valve 52 is opened/closed corresponding to ON/OFF of the instruction signal from the operational input device 53. Moreover, in the automatic mode, the instruction signal from the robot control device 6 is taken in through the relay 57, and the electromagnetic valve 52 is opened/closed corresponding to ON/OFF of this instruction signal.

TABLE 1

| Output Signal of Mode Selecting Device | Output Signal of Operational Input Device | Output Signal of Robot Control Device | Operation of Electromagnetic Valve of Extended Hand |
|---|---|---|---|
| OFF (Manual Mode) | ON | — | ON (Open) |
| | OFF | — | OFF (Close) |
| ON (Automatic Mode) | — | ON | ON (Open) |
| | — | OFF | OFF (Close) |

Here, a method of using of the end effector 5 is described. The end effector 5 can be used in each of modes of (I) the base hand 5A alone, (II) a complex of the base hand 5A and the extended hand 5B, and (III) the extended hand 5B alone.

[Use Mode of End Effector 5 (I)]

When using the base hand 5A alone as the end effector 5, the mechanical interface 14 of the wrist part 13 of the arm 10 of the robot 1 and the robot interface 71 of the base hand 5A of the end effector 5 are coupled, and the base hand 5A is attached to the arm 10. Moreover, the mode selecting device 59 is switched to the automatic mode, and the operation of the base hand 5A, i.e., the gripping operation and the releasing operation of the base hand 5A are controlled by the robot control device 6.

As described above, the base hand 5A attached to the arm 10 of the robot 1 functions as a gripper-type hand of the robot 1. That is, the robot 1 is capable of gripping the object in order to handle the object (e.g., to move or place it) by using the base hand 5A.

[Use Mode of End Effector 5 (II)]

When using the complex of the base hand 5A and the extended hand 5B as the end effector 5, the mechanical interface 14 of the wrist part 13 of the arm 10 of the robot 1 and the robot interface 71 of the base hand 5A of the end effector 5 are first coupled, and the base hand 5A is attached to the arm 10.

Then, the robot 1 operates the arm 10 and the base hand 5A to grip the grip 81 of the extended hand 5B by the grip fingers 72 of the base hand 5A. Thus, the base hand 5A and the extended hand 5B are joined. Here, the mode selecting device 59 is switched to the automatic mode, and the operation of the base hand 5A and the operation of the extended hand 5B are controlled by the robot control device 6.

As described above, the complex of the base hand 5A and the extended hand 5B attached to the arm 10 of the robot 1 operates as the end effector 5 of the robot 1 provided with the function of the functional part 82 of the extended hand 5B. In this embodiment, the complex of the base hand 5A and the extended hand 5B functions as the four-point adsorption type hand, and in order to handle the object, it is capable of adsorbing the object.

[Use Mode of End Effector 5 (III)]

Where using the extended hand 5B alone, the extended hand 5B functions as a tool which is manipulated by the worker, not as the end effector 5 of the robot 1. Therefore, the mode selecting device 59 is switched to the manual mode. As illustrated in FIG. 11, the worker grips the grip 81 of the extended hand 5B and moves the extended hand 5B to a desired position, for example, a position where the tip ends of the adsorption pads 92 are located immediately above the object, and then operates the operational input device 53 to cause the adsorption pads 92 to generate the absorption force. Alternatively, the worker grips the grip 81 of the extended hand 5B and moves the extended hand 5B to a desired position, for example, a target placing position of the object, and then operates the operational input device 53 to release the object from the adsorption pads 92.

As described above, the robot 1 according to this embodiment includes the arm 10, the end effector 5 attached to the wrist part 13 of the arm 10, and the robot control device 6 which controls the operations of the arm 10 and the end effector 5.

The end effector 5 according to this embodiment includes the base hand 5A (robot hand) coupled to the wrist part 13 of the arm 10, and the extended hand 5B (one example of the instrument) connected to the base hand 5A. This extended hand 5B has the grip 81 where the base hand 5A and the worker grip, and the functional part 82 coupled to this grip 81.

The extended hand 5B can also be used by the worker, and when the worker works at the work station 2, the worker grips the grip 81 of the extended hand 5B to handle the extended hand 5B, and can perform a work using this extended hand 5B. Thus, in the end effector 5, the extended hand 5B can be shared by the robot 1 and the worker.

Since the extended hand 5B can be shared by the robot 1 and the worker, the cost, installation spaces, etc. are reducible for the instruments (tools) for the worker, which are required conventionally. Moreover, since there is no necessity of replacing the instrument(s) upon a shift between the robot 1 and the worker, the shift becomes simple.

Further, by the robot 1 gripping the grip 81 of the extended hand 5B by the base hand 5A, the base hand 5A and the extended hand 5B are integrated. By the extended hand 5B integrated with the base hand 5A, the function of the base hand 5A is extended or added. Thus, without changing the structure of the robot 1, the versatility of the robot 1 can be increased by extending the function of the robot 1.

Moreover, in this embodiment, there are some functional parts 82 of the extended hand 5B which include at least one actuator mounted or attached to the extended hand 5B. For example, the four-point adsorption type extended hand 5B illustrated in FIG. 6 includes at least one adsorption cylinder connected with the functional part 82 through the negative pressure source 51 and piping. The electromagnetic valve 52 (solenoid actuator) which opens and closes the piping is one example of the actuator attached to the extended hand 5B.

Thus, if the actuator which operates the functional part 82 of the extended hand 5B is mounted or attached to the extended hand 5B, it can operate the extended hand 5B independently from the robot 1 and the base hand 5A. Thus, the structure in which the worker is able to work using the extended hand 5B is easily realizable.

Moreover, in this embodiment, the grip 81 presents the cylindrical shape, and has in the outer circumferential surface the engaging part 83 with which the grip fingers 72 of the base hand 5A or the worker's fingers engage. Here, the base hand 5A has the pair of parallel grip fingers 72 which approach and separate. Moreover, the engaging part 83 includes the grooves which are symmetrically provided through the axial center of the grip 81 and which extend parallel to the tangential directions in the outer circumferential surface of the grip 81 with the groove width into which the grip fingers 72 fits.

In the end effector 5 having the structure described above, by engaging the engaging parts 83 of the grip 81 and the grip fingers 72 of the base hand 5A, the extended hand 5B can be positioned with respect to the base hand 5A (i.e., the arm 10). Moreover, by engaging the engaging parts 83 of the grip 81 and the worker's fingers, the worker is able to stably handle the extended hand 5B.

Moreover, in this embodiment, the extended hand 5B is accompanied with the instrument control device 54 which is electrically connected with the electromagnetic valve 52 (actuator) which operates the functional part 82, the operational input device 53, and the robot control device 6. This instrument control device 54 is to electrically connect one selected from the operational input device 53 and the robot control device 6 with the electromagnetic valve 52.

The operational input device 53 described above may be, for example, the foot switch, or the button switch or the lever switch provided to the grip 81. Such an operational input device 53 is suitable for being operated by the worker, while he/she grips the extended hand 5B.

The instrument control device 54 is electrically connected with a mode selecting device 59 which inputs the selection instruction of the automatic mode and the manual mode. The instrument control device 54 electrically connects the robot control device 6 with the electromagnetic valve 52, when the selection instruction of the automatic mode is inputted from the mode selecting device 59. That is, the connection between the control system of the extended hand 5B and the operational input device 53 which the worker operates is canceled, and the control system of the extended hand 5B is connected with the control system of the robot 1. Moreover, the instrument control device 54 electrically connects the operational input device 53 with the electromagnetic valve 52, when the selection instruction of the manual mode is inputted from the mode selecting device 59. That is, the connection between the control system of the extended hand 5B and the control system of the robot 1 is canceled, and the control system of the extended hand 5B is connected with the operational input device 53 which the worker operates.

Thus, since one selected from the operational input device 53 and the robot control device 6 is electrically connected with the electromagnetic valve 52, the state where the extended hand 5B is controlled by the robot control device 6 (automatic mode) and the state where the extended hand 5B is operated by the worker through the operational input device 53 (manual mode) can be switched.

[Working Method of Robot 1]

Here, a working method of the robot 1 having the above structure is described.

The robot 1 first operates the arm 10 and the base hand 5A to grip by the grip fingers 72 of the base hand 5A, the grip 81 of the extended hand 5B held by the rack 100.

As described above, by the robot 1 gripping the grip 81 of the extended hand 5B by the base hand 5A, the base hand 5A and the extended hand 5B are joined. Thus, the function of the robot 1 is extended or added by joining the extended hand 5B to the base hand 5A.

Next, the robot 1 operates the arm 10 and the extended hand 5B while holding the gripping of the grip 81 of the extended hand 5B by the base hand 5A, to act the extended hand 5B on the object. Here, if the extended hand 5B was used by the worker until just before, before operating the extended hand 5B, the connection between the control system of the extended hand 5B and the operational input device 53 which the worker operates is canceled, and the control system of the extended hand 5B is connected with the control system of the robot 1.

Further, the robot 1 may cancel the gripping of the grip 81 of the extended hand 5B by the base hand 5A, and operate the arm 10 and the base hand 5A to act the base hand 5A on the object. Thus, the robot 1 is capable of removing the extended hand 5B from the base hand 5A, and handling the object using the base hand 5A.

[Variation of Extended Hand 5B]

Although the extended hand 5B according to the embodiment described above is the four-point adsorption type hand, the extended hand 5B is not limited to this structure, but may take various structures according to the demanded function. For example, the extended hand 5B may be at least one type of (a) a grip type hand, (b) a non-grip type hand, (c) a tool hand and an instrument hand which exhibits functions as a tool and an instrument, and (d) a conveyance hand Thus, below, the variation of the extended hand 5B of the end effector 5 is described. In the following description, the same reference characters may be given in the drawings to the same or similar members as/to those of the embodiment described above to omit description thereof.

(a) Grip Type Hand

The grip type hand includes a slide type gripper in which a pair of fingers slide, a rotary type gripper in which a pair of fingers rotate, a multiple finger gripper provided with a plurality of fingers, etc.

Figure 14:
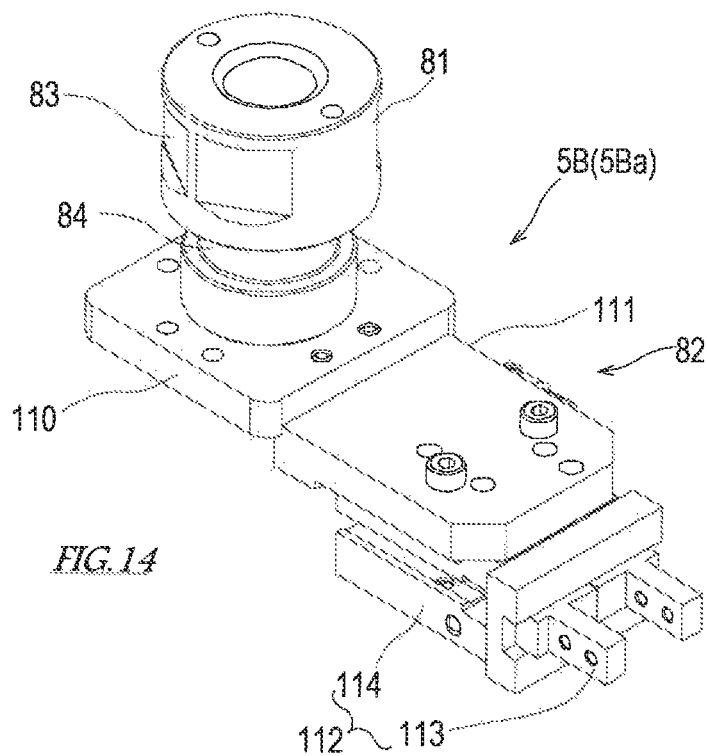
FIG. 14 is a perspective view illustrating a single chuck type extended hand.

FIG. 14 is a perspective view illustrating a single chuck type extended hand 5B. The extended hand 5B illustrated in FIG. 14 is a single chuck-type hand 5Ba. This single chuck-type hand 5Ba includes a grip 81, a base plate 110 fixed to the grip 81, an extended plate 111 attached to the base plate 110, and a chuck 112 of parallel opening-and-closing type supported by the extended plate 111. The chuck 112 may be, for example, an air chuck provided with a pair of grip jaws, an air cylinder which translates the pair of grip jaws while maintaining the mutual parallelism, and a linear guide which guides the translation of the pair of grip jaws.

Grip jaws 113 of the chuck 112 are smaller than the grip fingers 72 of the base hand 5A, and it is suitable for gripping a small object which is difficult to be gripped by the grip fingers 72 of the base hand 5A. In the base plate 110, a pair of extended plate 111 attaching holes are formed at four different positions. Thus, the attaching position of the extended plate 111 to the base plate 110 is selectable. According to the demanded function, the attaching position of the extended plate 111 to the base plate 110 is adjusted.

FIG. 15 is a perspective view illustrating a double rotary chuck type extended hand 5B. The extended hand 5B illustrated in FIG. 15 is the double rotary chuck-type hand 5Bb. This double rotary chuck-type hand 5Bb includes a grip 81, a rotary actuator 115 fixed to the grip 81, a rotary table 116 which is rotated and driven by the rotary actuator 115, and a first chuck 117 and a second chuck 118 which are attached to the rotary table 116. The first chuck 117 and the second chuck 118 may be, for example, an air chuck comprised of a pair of grip jaws, and an air cylinder which translates the pair of grip jaws while maintaining the mutual parallelism, a linear guide which guides the translation of the pair of grip jaws, etc.

The first chuck 117 and the second chuck 118 are attached to the rotary table 116 at phases offset by 90 degrees. Therefore, one of the first chuck 117 and the second chuck 118 can take a horizontal posture, and the other can take a vertical posture. The two chucks 117 and 118 may be provided with the same type of grip jaw, or may be provided with different type of grip jaw. Alternatively, an element of other kinds, such as an adsorption pad, may be provided, instead of one of the first chuck 117 and the second chuck 118.

(b) Non-Grip Type Hand

The non-grip type hand includes a hand which fixes the object to the hand by a method other than the gripping, such as scooping, hooking, stabbing, adhering, vacuum adsorbing, magnetic adsorbing, electrostatic adsorbing, etc.

FIG. 16 is a side view illustrating a single adsorption type extended hand 5B. The extended hand 5B illustrated in FIG. 16 is a single adsorption type hand 5Bc. This single adsorption type hand 5Bc includes a grip 81, a base plate 120 fixed to the grip 81, and an adsorption cylinder 122 attached to the base plate 120. An adsorption pad 123 is provided to a tip end of a guide rod which advances from and retreats to the adsorption cylinder 122.

FIG. 17 is a perspective view illustrating a double adsorption type extended hand 5B. The extended hand 5B illustrated in FIG. 17 is a double adsorption type hand 5Bd. The double adsorption type hand 5Bd is extended from the single adsorption type hand 5Bc, and is provided with two adsorption cylinders 122. This double adsorption type hand 5Bd includes a grip 81, a base plate 120 fixed to the grip 81, a support plate 121 fixed to the base plate 120, and two adsorption cylinders 122 fixed to the support plate 121. In each adsorption cylinder 122, an adsorption pad 123 is provided to a tip end of a guide rod which advances from and retreats to the adsorption cylinder 122.

By being provided with the two adsorption cylinders 122, the double adsorption type hand 5Bd is capable of adsorbing workpieces to each adsorption pad 123 to convey two workpieces simultaneously. Moreover, the two adsorption pads 123 may adsorb one workpiece.

FIG. 18 is a side view illustrating a double rotary adsorption type extended hand 5B. The extended hand 5B illustrated in FIG. 18 is a double rotary adsorption type hand 5Be. This double rotary adsorption type hand 5Be includes a grip 81, a rotary actuator 125 fixed to the grip 81, a rotary table 126 which is rotated and driven by the rotary actuator 125, and two adsorption cylinders 127 attached to the rotary table 126. In each adsorption cylinder 127, an adsorption pad 128 is provided to a tip end of a guide rod which advances from and retreats to the adsorption cylinder 127. The two adsorption cylinders 127 are attached to the rotary table 126 at phases offset by 90 degrees. Therefore, one of the two adsorption cylinders 127 can take a horizontal posture, and the other can take a vertical posture.

(c) Tool Hand and Instrument Hand

The tool hand and the instrument hand include tools and instruments which actually work themselves, such as an arc-welding torch, a spot-welding gun, a sander a grinder, a deburring machine, a leutor, a drill, a spray gun, an adhesive gun, a silicone applicating gun, an automatic screwdriver, a laser cutting gun, and a water jet gun.

FIG. 19 is a perspective view of a screwdriver type extended hand 5B, and FIG. 20 is a side view of the screwdriver type extended hand 5B of FIG. 19. The extended hand 5B illustrated in FIGS. 19 and 20 is a screwdriver type hand 5Bf. This screwdriver type hand 5Bf includes a grip 81, a base plate 130 coupled to the grip 81, and an automatic screwdriver 131 supported by the base plate 130. The automatic screwdriver 131 is comprised of an electric motor 132 (electric actuator) and a rotating tool 133.

When the robot 1 uses this screwdriver type hand 5Bf, the robot 1 grips the grip 81 by the base hand 5A attached to the wrist part 13 of the arm 10. Moreover, when the worker uses this screwdriver type hand 5Bf, the worker may grip the grip 81 or may grip a case of the electric motor 132 of the automatic screwdriver 131.

Figure 21:
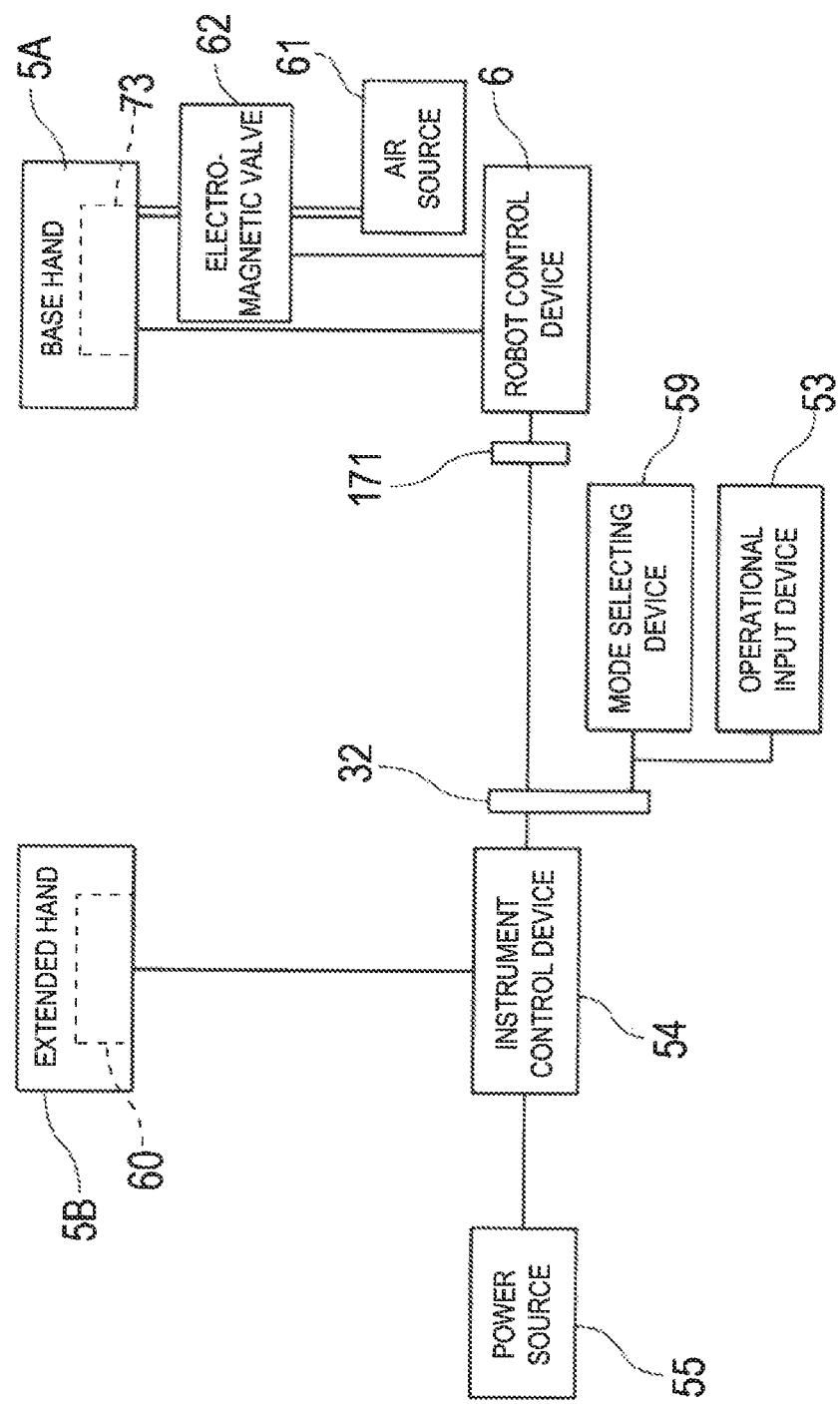
FIG. 21 is a conceptual diagram of piping and wiring of the industrial robot when the extended hand illustrated in FIG. 19 is used.

In FIG. 21, a configuration of the piping and wiring system of the robot 1 when the screwdriver type hand 5Bf is adopted is illustrated. The electric motor 132 is connected with a power source 55 by wiring through the instrument control device 54. An instruction of normal rotation/reverse rotation/OFF of the automatic screwdriver 131 is inputted into the operational input device 53. The operational input device 53 outputs an instruction signal of normal rotation/reverse rotation/OFF, based on the instruction. The instrument control device 54 switches connection/disconnection and a flow of current between the electric motor 132 and the power source 55 based on the instruction signal inputted from the operational input device 53.

Figure 22:
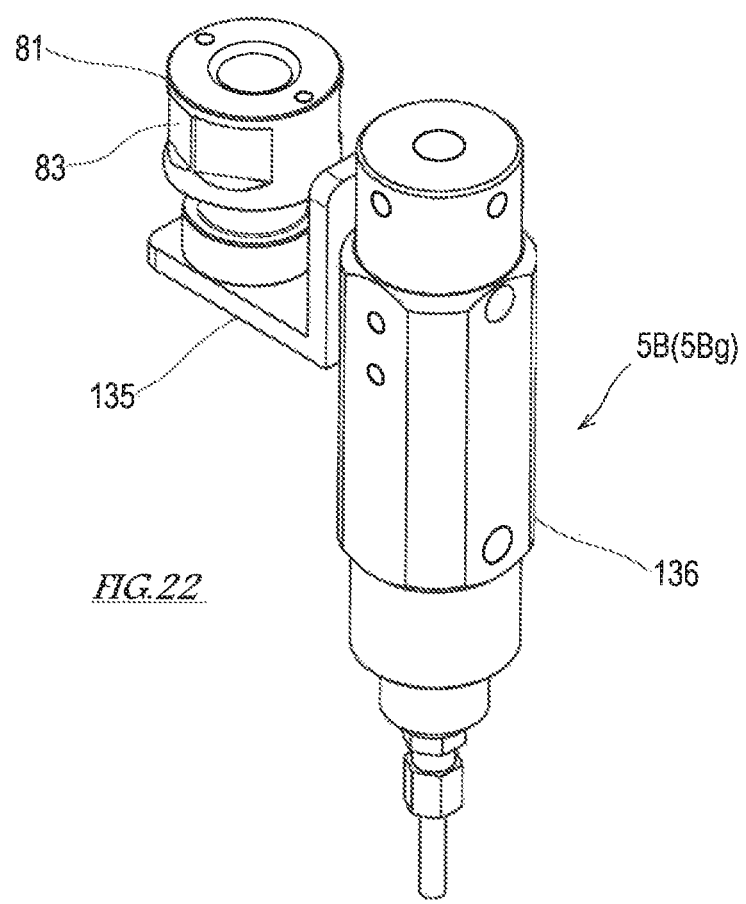
FIG. 22 is a perspective view of a silicone applicating gun type extended hand and a base hand which grips the extended hand.

FIG. 22 is a perspective view of a silicone applicating gun type extended hand 5B. The extended hand 5B illustrated in FIG. 22 is a silicone applicating gun type hand 5Bg. This silicone applicating gun type hand 5Bg includes a grip 81, a base plate 135 coupled to the grip 81, and a silicone applicating gun 136 supported by the base plate 135. When the robot 1 uses this silicone applicating gun type hand 5Bg, the robot 1 grips the grip 81 by the base hand 5A attached to the wrist part 13 of the arm 10. Moreover, when the worker uses this silicone applicating gun type hand 5Bg, the worker may grip the grip 81 or may grip a case of the silicone applicating gun 136.

Figure 23:
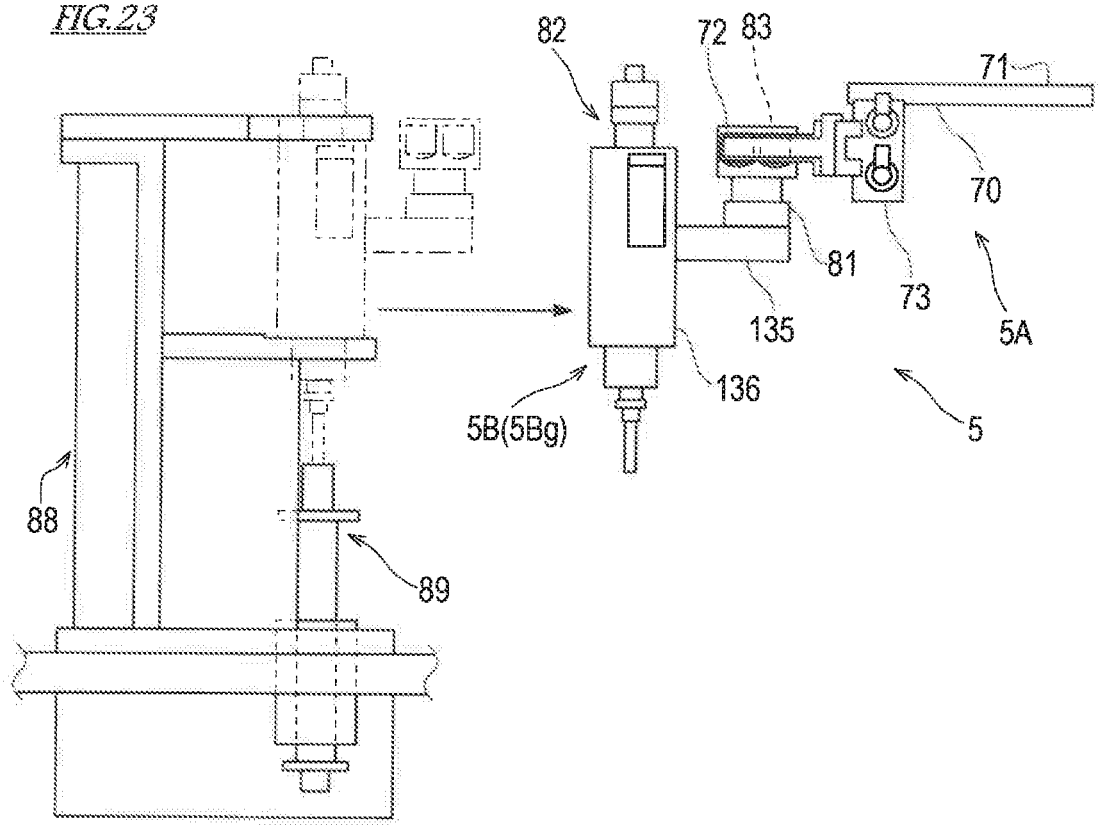
FIG. 23 is a view illustrating a situation in which the silicone applicating gun type extended hand is removed from a stand.

In FIG. 23, the silicone applicating gun type hand 5Bg, the base hand 5A which grips the silicone applicating gun type hand 5Bg, and a stand 88 which supports the silicone applicating gun type hand 5Bg when the hand 5Bg is not used are collectively illustrated. This stand 88 is provided with a dryness prevention jig 89 which prevents dryness of silicone by closing a discharge port of the supported silicone applicating gun 136.

Figure 24:
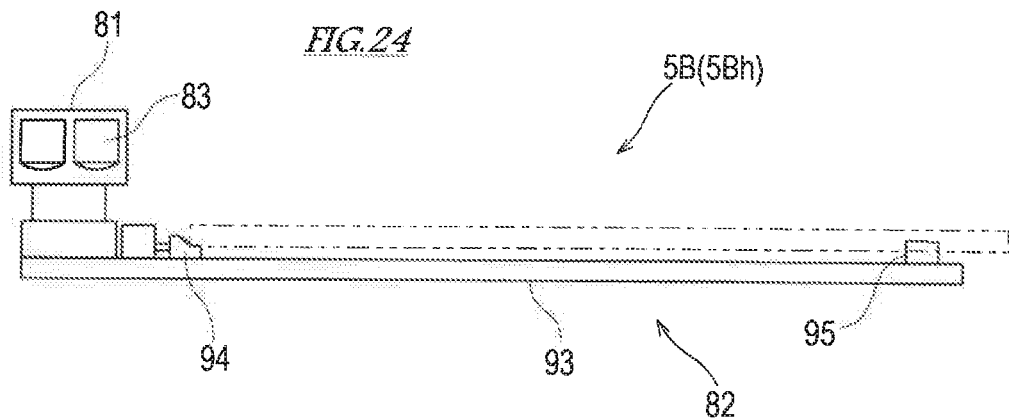
FIG. 24 is a side view of the extended hand for wafer conveyance.

FIG. 24 is a side view of the extended hand 5B for wafer conveyance. The extended hand 5B illustrated in FIG. 24 is a hand 5Bh for wafer conveyance which conveys a disk-shaped semiconductor wafer. This hand 5Bh for wafer conveyance includes a grip 81, a base plate 93 having a scissors shape in the plan view, which is coupled to the grip 81, and an air chuck 94 and a grip jaw 95 for making the base plate 93 hold the wafer. By the air chuck 94 and the grip jaw 95 gripping an edge of the wafer placed on the base plate 93A, the wafer is fixed to the base plate 93. Note that the piping and wiring systems of the robot 1 when the extended hand 5B is the hand 5Bh for wafer conveyance are similar to those illustrated in FIG. 12 where the negative pressure source 51 is replaced with an air source, and this air source and the air chuck 94 are connected through the piping and the electromagnetic valve 52.

(d) Conveyance Hand

The conveyance hand does not have a driver, such as an actuator, but it has a function as a support for carrying the object placed thereon. The conveyance hand may have a suitable shape according to the object. Below, the conveyance hand which conveys the plate-like object, such as a glass plate, and the conveyance hand which conveys the plate-like object, such as a substrate, which is smaller than the glass plate, are described.

Figure 25:
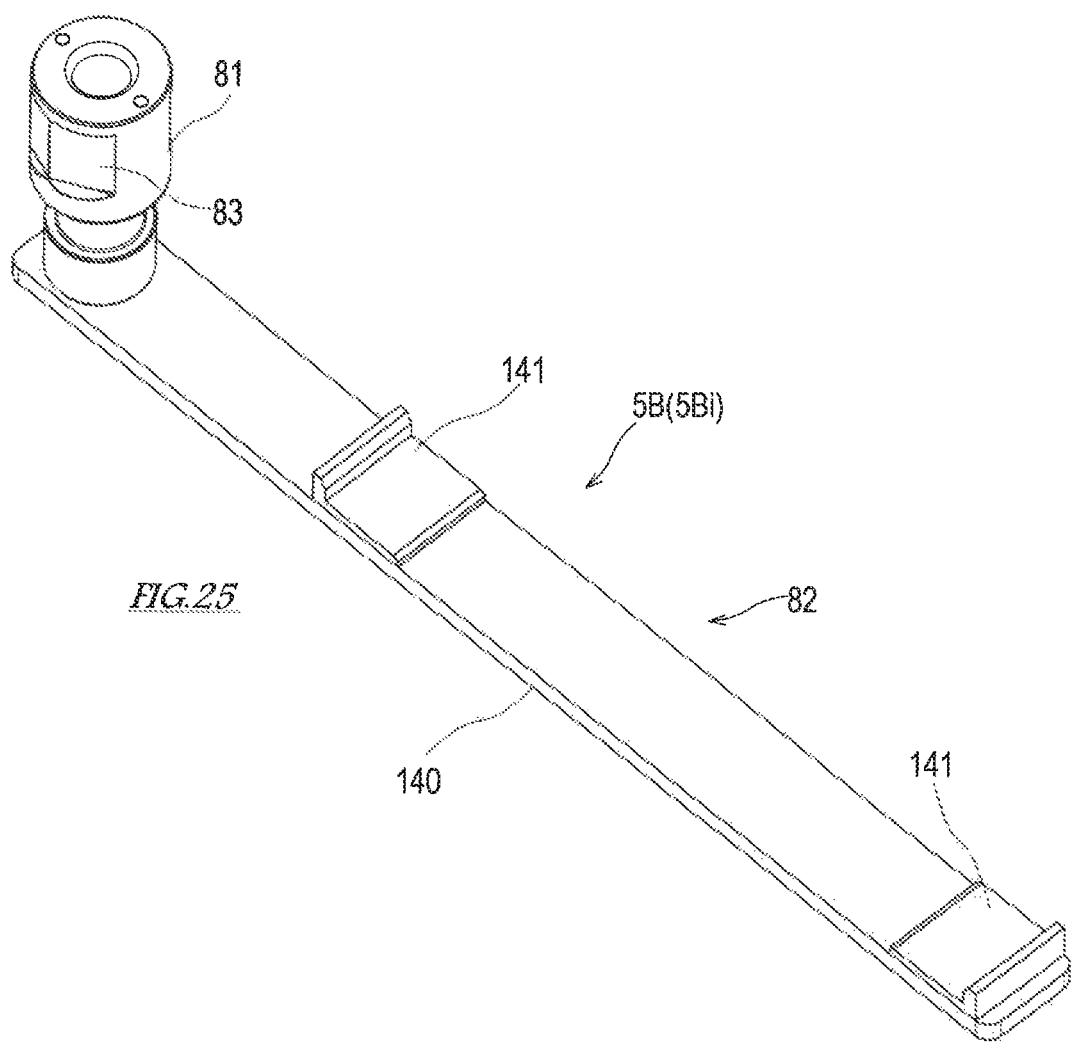
FIG. 25 is a perspective view illustrating the extended hand for glass plate conveyance.

FIG. 25 is a side view of the extended hand 5B for glass plate conveyance. The extended hand 5B illustrated in FIG. 25 is a glass plate conveyance hand 5Bi which is used when conveying the plate-like object, such as a glass plate. This glass plate conveyance hand 5Bi includes a grip 81 and a support plate 140 coupled to the grip 81. The support plate 140 is a plate-like member extending in one direction. A pad 141 with which the glass plate placed on the support plate 140 contacts is provided to an upper surface of the support plate 140.

Figure 26:
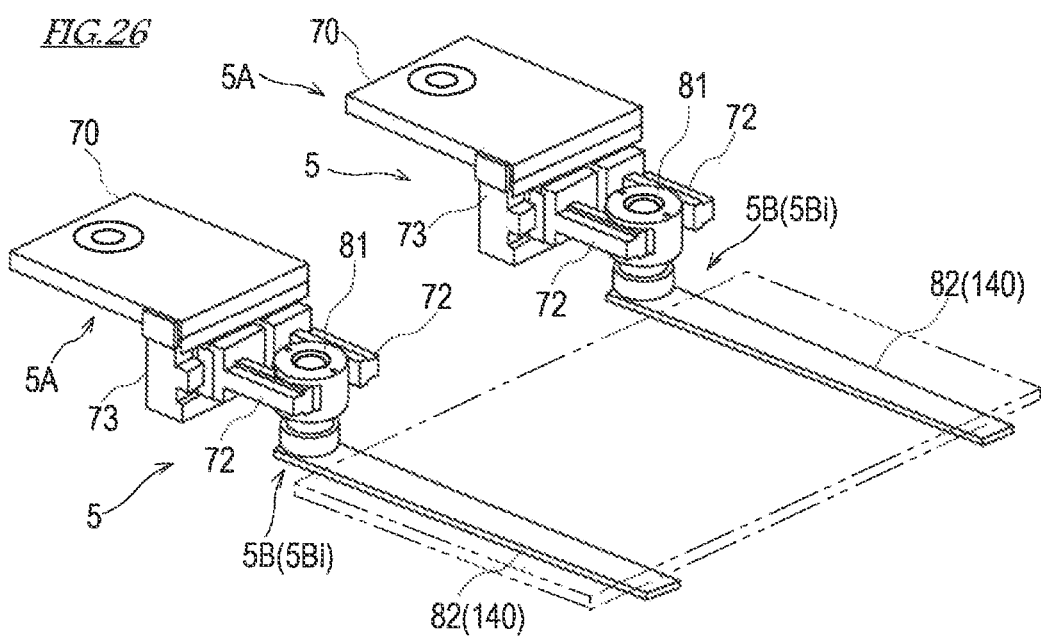
FIG. 26 is a view illustrating a use mode of the extended hands for glass plate conveyance of FIG. 25.

FIG. 26 is a view illustrating a use mode of the extended hand 5B for glass plate conveyance of FIG. 25. As illustrated in FIG. 26, the glass plate conveyance hand 5Bi is used as a pair, and is joined to the base hand 5A attached to the left and right arms 10A and 10B of the dual-arm robot 1, respectively. The glass plate is scooped up from below by the support plates 140 of the two glass plate conveyance hands 5Bi, and is conveyed in a state where it is placed on the support plate 140.

Figure 27:
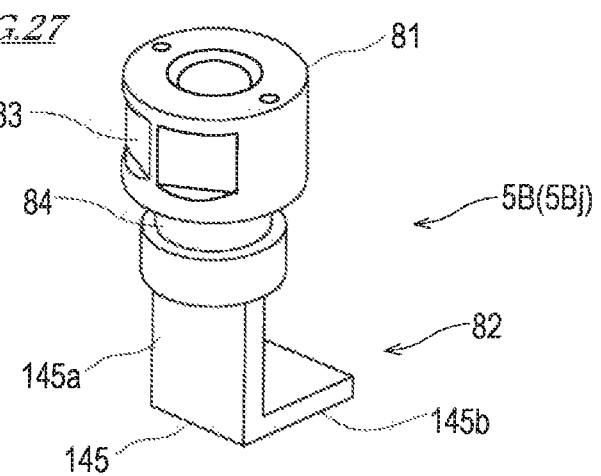
FIG. 27 is a perspective view illustrating an extended hand for substrate conveyance.

FIG. 27 is a side view of the extended hand 5B for substrate conveyance. The extended hand 5B illustrated in FIG. 27 is a hand 5Bj for substrate conveyance which is used when conveying the plate-like object, such as a substrate. This hand 5Bj for substrate conveyance includes a grip 81 and a support plate 145 coupled to the grip 81. The support plate 145 presents a form in which a plate-like member is bent in an L-shape, and has a side part 145a and a bottom part 145b integrally.

Figure 28:
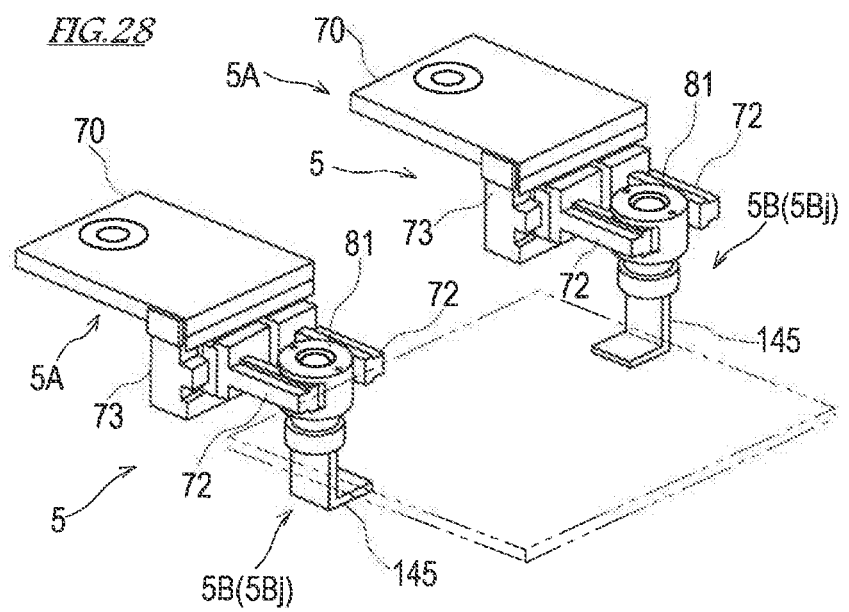
FIG. 28 is a side perspective view of the extended hands for substrate conveyance of FIG. 27 and the base hands which grip the extended hands.

FIG. 28 is a view illustrating a use mode of the extended hand 5B for substrate conveyance of FIG. 27. As illustrated in FIG. 28, the hand 5Bj for substrate conveyance is used as a pair, and is joined to the base hand 5A attached to the left and right arms 10A and 10B of the dual-arm robot 1, respectively. In a state where the bottom parts 145b of the two hands 5Bj for substrate conveyance are opposed to each other, the substrate is pinched from both left and right sides by the side parts 145a of the support plates 145, the substrate is then scooped up from below by the bottom parts 145b of the support plates 145 so that the substrate is held. The substrate is conveyed in the state where it is supported by the bottom parts 145b of the support plates 145.

Although the variation of the extended hand 5B is illustrated above, the variation of the extended hand 5B is not limited to the above structures, but may be designed and manufactured according to a user's demand.

[Rack 100]

Here, the rack 100 for placing the extended hand 5B on the base 20 is described.

Figure 29:
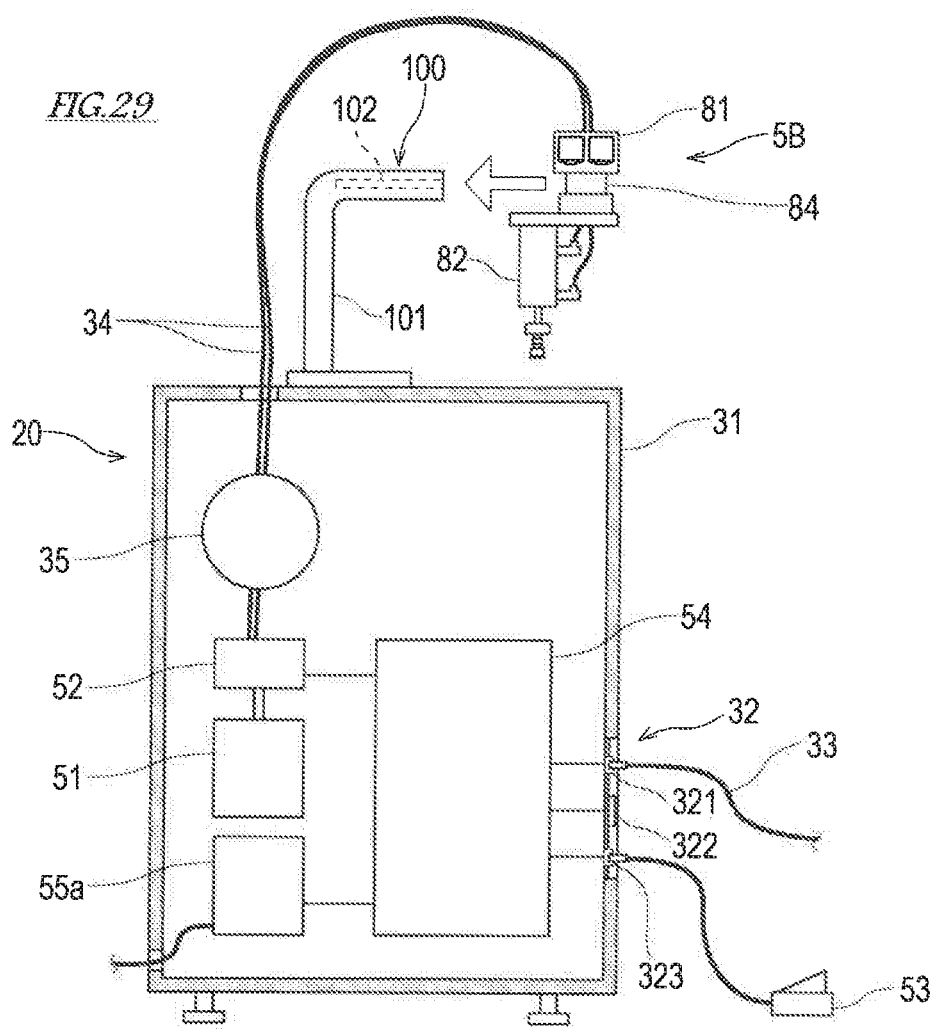
FIG. 29 is side cross-sectional view illustrating one example of a base to which a rack is provided.
Figure 30:
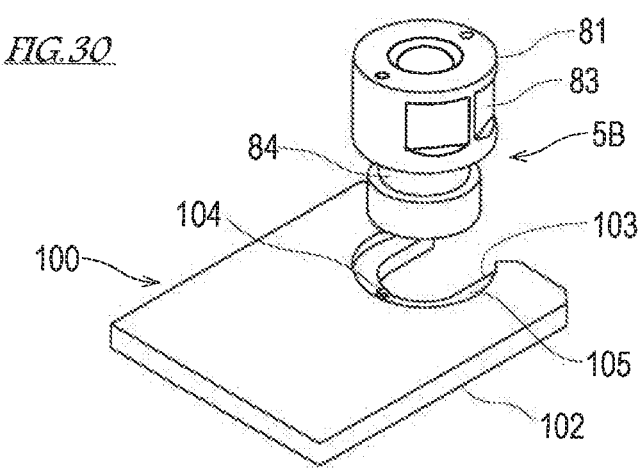
FIG. 30 is a perspective view illustrating seating plate of the rack, and the grip of the extended hand.
Figure 31:
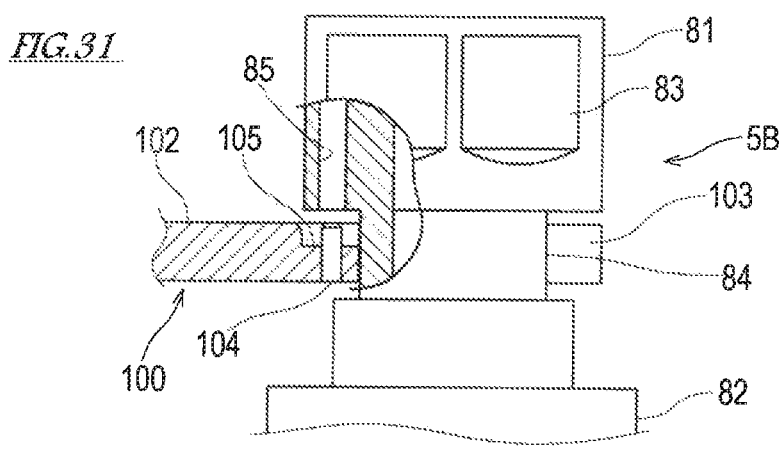
FIG. 31 is a view illustrating a positioning mechanism of the rack and the extended hand.

FIG. 29 is a side cross-sectional view illustrating one example of the base 20 provided with the rack 100, FIG. 30 is a perspective view illustrating a seating plate 102 of the rack 100 and the grip 81 of the extended hand 5B, and FIG. 31 is a view illustrating a positioning mechanism of the rack 100 and the extended hand 5B. Note that, in FIG. 30, only the grip 81 of the extended hand 5B is illustrated, and the functional part 82 is omitted.

As illustrated in FIGS. 1 to 3, 29 and 30, the extended hand 5B is held in a state where it floats from the base by the rack 100 so that it does not contact the upper surface of the base 20 and it is easily taken out by the robot 1 and the worker.

The rack 100 is comprised of a leg 101 fixed to the upper surface of the base 20, and the seating plate 102 supported by the leg 101.

The seating plate 102 is a plate-like member, where a slot 103 into which the neck part 84 of the grip 81 of the extended hand 5B is inserted is formed. The width of the slot 103 is smaller than the diameter of the neck part 84 of the grip 81, and is larger than parts of the grip 81 other than the neck part 84. Moreover, a concave part 105 in the plate thickness directions is formed in the perimeter of the slot 103 in the seating plate 102, into which a part of the grip 81 above the neck part 84 is dropped. By the grip 81 fitting into this concave part 105, the extended hand 5B is positioned vertically and horizontally with respect to the rack 100.

As illustrated in FIG. 31, a positioning pin 104 is provided to a bottom surface of the concave part 105 in the seating plate 102. On the other hand, a positioning hole 85 which opens downwardly is formed in a part of the grip 81 of the extended hand 5B above the neck part 84. Thus, by inserting the positioning pin 104 into the positioning hole 85 of the grip 81 which fits into the concave part 105 of the seating plate 102, the extended hand 5B is positioned in horizontal rotational directions with respect to the rack 100, i.e., the rotational phase of the extended hand 5B is positioned with respect to the rack 100. Moreover, the relative rotation of the extended hand 5B to the rack 100 is regulated by inserting the positioning pin 104 at the positioning hole 85.

Note that the base 20 illustrated in FIG. 29 supports the single adsorption type hand 5Bc, and piping (tube) 34 connected with the adsorption cylinder 122 of the single adsorption type hand 5Bc is introduced into a casing 31 of the base 20. Note that a winder 35 for the piping 34 may be provided so that the length of the piping 34 pulled out from the base 20 is adjustable. Moreover, the instrument control device 54 for operating the single adsorption type hand 5Bc, the negative pressure source 51, the electromagnetic valve 52, an electric power unit 55a which intervenes between the power source 55 and the instrument control device 54 are accommodated inside the casing 31 of the base 20. The interface 32 is provided to an external surface of the casing 31 of the base 20. A connector receiving part 321 which receives connectors of the wiring and piping 33 connected with the robot 1, a connector 323 of the operational input device 53, a console 322 including the mode selecting device 59, etc. are provided to the interface 32.

The connector receiving part 321 is electrically connected with the instrument control device 54 (as a result, the driver of the extended hand 5B). Note that the form (shape and dimension) of the connector receiving part 321 provided in each base 20 is common so that the interface 171 of the robot 1 is also connectable with any interface 32 of the bases 20 which form the work station 2, by using the same type of wiring and piping.

[Manufacturing System and Method of Constructing the System]

Here, a manufacturing system installed at the production facility and a method of constructing the manufacturing system are described. The robot 1 and the end effector 5 described above are used for this manufacturing system.

Figure 32:
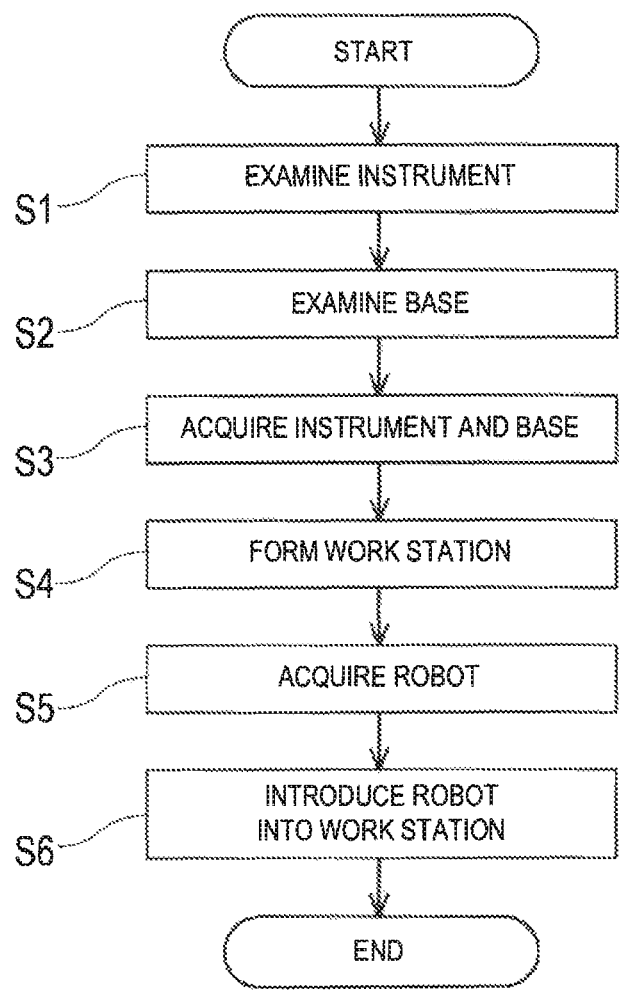
FIG. 32 is a view illustrating a flow of a method of constructing a manufacturing system.

The manufacturing system is comprised of at least one robot 1 and at least one work station 2. The work station 2 is formed by at least one instrument (machine and tool) and the base 20 which supports the instrument. The instrument includes at least one extended hand 5B. Below, the method of constructing such a manufacturing system is described with reference to FIG. 32.

Upon constructing the manufacturing system, the user first examines the work performed at the work station 2, and the instrument(s) required for this work (Step S1). The base 20 and the instrument correspond to the work performed at the production facility. Here, as one example, for a case where a work in which the plate-like component is assembled to the substrate at the work station 2 is performed, instruments required for the work are examined using FIG. 1.

The conveyor 25 is required in order to carry the substrate into the work station 2. In order to work on the substrate, the jig 28 which maintains the position of the substrate is required. In order to transfer the substrate from the conveyor 25 to the jig 28, the hand 5Bj for substrate conveyance is required for each of both left and right sides of the work station 2 when viewed from the robot 1 or the worker. In order to pick out from the box 24 the plate-like component to be assembled to the substrate, the single chuck-type hand 5Ba is required. The single chuck-type hand 5Ba is desirable to be disposed near the box 24. In order to carry out the posture conversion of the plate-like component in the vertical posture picked out from the box 24 into the horizontal posture, the posture converting device 27 is required. In order to place the plate-like component which became in the horizontal posture on the substrate of which the position is maintained by the jig 28, the pair of hands 5Bj for substrate conveyance can be used. In order to fasten the substrate and the plate-like component with screws, the screw feeding device 26 and the screwdriver type hand 5Bf are required. In order to carry the substrate to which the plate-like component is assembled out of the work station 2, the conveyor 22 is required.

In the examples described above, the instruments required for the work at the work station 2 include the extended hand 5B, the conveyors 22 and 25, the posture converting device 27, the screw feeding device 26, the box 24, the jig 28, etc. Note that the instruments correspond to the work performed at the production facility, and they are not limited to the example described above.

When the examination of the instruments required for the work is finished, the user then examines the base 20 (a stand or a table) where these instruments are provided and an arrangement thereof (Step S2). In FIG. 1, although the plurality of bases 20 are arranged at one work station 2, the number of bases 20 may be one. Moreover, although the base 20C and the base 20D which is arranged on left side when viewed from the robot 1 or the worker have been independent in FIG. 1, these may be one base 20.

When the examination of the base 20 and the instruments is finished, the user then acquires the base 20 and the instruments (Step S3). The base 20 and the instruments will mainly be what are tailored according to the user's demand (i.e., according to the work).

Among the instruments for performing the work in the example described above, the conveyors 22 and 25, the posture converting device 27, the screw feeding device 26, the box 24, and the jig 28 may be either one of custom-made and ready-made. Moreover, the existing instruments at the production facility may be used.

Among the instruments for performing the work in the example described above, the extended hands 5B are the pair of hands 5Bj for substrate conveyance, the single chuck-type hand 5Ba, and the screwdriver type hand 5Bf. These extended hands 5B have the grip 81 of the common form (i.e., shape and dimension), and the functional part 82 according to each function. In other words, the shape and dimension of the grip 81 of the extended hand 5B are standardized in this manufacturing system, and each extended hand 5B is created in conformity with this standard.

The grip 81 is not the expensive conventional tool changer and, thus, it does not accompany jointing of the shaft, piping, wiring, etc. upon jointing the grip fingers 72 of the base hand 5A. Therefore, the grip 81 is less in price and, thus, the extended hand 5B can reduce the creation cost as compared with the tool provided with the conventional tool changer.

The extended hands 5B as described above are custom-made in principle. This is because the function required for the extended hand 5B differs for every user, and is high in exclusive-use nature.

The designing and manufacturing of the extended hand 5B may be carried out by a robot manufacturer or the user. Alternatively, the robot manufacturer may provide a common grip 81, and the user may carry out the designing and manufacturing of the functional part 82 to be coupled to the grip 81. Here, the user may prepare an existing instrument or a commercially available instrument in the production facility as the functional part 82 and connect the grip 81 with the instrument to manufacture the extended hand 5B. If the plurality of extended hands 5B are provided with the grip 81 of the common shape, the mode of the functional part 82 is not limited.

Note that the extended hand 5B with high versatility may be manufactured industrially by the robot manufacturer, and may be leased by the user. Thus, since the designing and manufacturing process of the extended hand 5B can be omitted if the extended hand 5B of ready-made is adopted, the manufacturing system can be constructed early.

As for the base 20, a base designed and manufactured by custom-made or ready-made can be utilized according to the instrument to support. For example, as the bases 20 for the conveyors 22 and 25, ready-made stands corresponding to the conveyors 22 and 25 can be utilized. Moreover, for example, as for the base 20 where the custom-made extended hand 5B is supported, a base in which the rack 100 is attached to the casing 31 of the ready-made base 20 and various elements for operating the extended hand 5B are accommodated therein may be utilized.

The base 20 may be provided with at least one connector receiving part 321 which receives the connectors of the wiring and/or piping connected with the robot 1. This connector receiving part 321 is electrically connected with at least one instrument. If there is a plurality of bases 20, the connector receiving parts 321 provided to the bases 20 may have a common form (i.e., shape and dimension).

When the bases 20 and the instruments are ready, the work station 2 is formed at the production facility (Step S4). The work station 2 is comprehensively custom-made, even if at least a part thereof is comprised of the ready-made base(s) 20 and instrument(s). That is, the work station 2 is constructed according to the user's individual demand.

The user acquires from the robot manufacturer by lease or purchase the robot 1 which works at the work station 2 (Step S5). Here, if the user leases the robot 1, the introducing cost of the manufacturing system is further reduced.

The robot 1 includes the hand cart 17, the arm 10 supported by the hand cart 17, the base hand 5A attached to the arm 10, and the robot control device 6 stored in the hand cart 17. The robot 1 has the grip fingers 72 (i.e., jointing means with the extended hand 5B) of the base hand 5A of the unified shape and dimension. In other words, similar to the grip 81, the shape and dimension of the grip fingers 72 of the base hand 5A are standardized in this manufacturing system, and the base hand 5A of each robot 1 has the grip fingers 72 in accordance with this standard. Therefore, if each robot 1 has the grip fingers 72 of the base hand 5A in accordance with the standard, the mode of the arm 10 (e.g., single arm/dual arm, the number of links and joints, the serially coupling direction of the links, etc.) is not limited. For example, the first robot 1 may have the arm 10 with a single arm of three axes, while the second robot 1 may have the arm 10 with a dual arm of six axes.

At last, the manufacturing system is constructed by introducing at least one robot 1 of ready-made into the custom-made work station 2 (Step S6). Note that the introduction of the robot 1 is accompanied with the installation of the robot 1 at the work station 2 and the connection of the wiring and piping.

In the manufacturing system described above, the robot 1 can work at the work station 2, and the worker can perform the same work as the robot 1 at the same work station 2. For example, the worker and the robot 1 are alternately introduced into the work station 2, and the work at the work station 2 is continued.

Moreover, in the manufacturing system described above, the first robot 1 can work at the work station 2, and the second robot 1 can perform the same work as the first robot 1 at the same work station 2. For example, during maintenance of the first robot 1, the second robot 1 is introduced into the work station 2, and the work at the work station 2 is continued.

Moreover, in the manufacturing system described above, the robot 1 can be introduced into another work station 2 where a different work (or the same work) from the work station 2 is performed. Thus, the robot 1 which performs the works over the plurality of work stations 2 may be configured to store a teaching program of the work for the robot control device 6 performing at each work station 2, and read and execute the teaching program corresponding to the work station 2 into which the robot 1 is introduced.

As described above, the manufacturing system according to this embodiment includes the industrial robot 1 having the robotic arm 10 and the base hand 5A (robot hand) serially coupled to the robotic arm 10, and the work station 2 having the extended hand 5B (one example of instrument) provided with the grip 81 which the base hand 5A grips. The work station 2 has the plurality of extended hands 5B, and the grips 81 of the extended hands 5B have the common form (i.e., shape and dimension).

Moreover, as described above, the method of constructing the manufacturing system according to the embodiment includes a step for forming the work station 2 provided with the extended hand 5B (one example of instrument) having the grip 81 and the base 20 which supports the extended hand 5B, a step for acquiring by lease or purchase the industrial robot 1 provided with the base hand 5A (one example of robot hand) which grips the grip 81 and the robotic arm 10 serially coupled to the base hand 5A, and a step for introducing the robot 1 into the work station 2. Here, the step for forming the work station 2 may include a step for acquiring the plurality of extended hands 5B with the grips 81 having the common form.

The manufacturing system described above does not require the connections of the wiring and piping in the jointing part of the base hand 5A and the grip 81. Thus, the grip 81 does not need to be provided with connectors etc., and it is possible to manufacture the grip 81 at an economical price. Therefore, the user can acquire the plurality of instruments with the grips 81 having the common form at comparatively low cost. Further, since the base hand 5A which performs the gripping operation is high in versatility, the user can acquire the robot 1 at low cost as compared with the case where the robot hand of high exclusive-use nature is provided. Therefore, according to the manufacturing system and the method of constructing the manufacturing system according to this embodiment, the introducing cost of the manufacturing system using the industrial robot is reduced.

Moreover, in the manufacturing system described above, the wiring and piping which are used in common when the robot 1 works and when the worker works are connected to the extended hand 5B, without passing through the jointing part of the base hand 5A and the grip 81. Thus, the wiring and piping to the extended hand 5B can be made common between the case where the robot 1 works and the case where the worker works. Note that the wiring and piping which are used only when the robot 1 works but are not used when the worker works may pass through the jointing part of the base hand 5A and the grip 81.

In the manufacturing system according to the embodiment described above, the robot 1 has the plurality of robotic arms 10, and the base hands 5A serially coupled to the robotic arm 10 have the common form (i.e., shape and dimension). Note that the plurality of base hands 5A having the common form are provided with the grip fingers 72 having the common form. In the plurality of base hands 5A having the common form, the form of a palm part of the base hand 5A, and the structure of the actuator 73 for operating the grip fingers 72 may be different.

The manufacturing system according to the embodiment described above may be provided with the plurality of robots 1, and the base hands 5A of the robot 1 may have a common form.

Moreover, in the method of constructing the manufacturing system according to the embodiment described above, the step for acquiring the robot 1 may include a step for acquiring the plurality of robots 1 with the base hands 5A having the common form.

Thus, if the forms of the base hands 5A attached to the robotic arm 10 introduced into the work station 2 are common regardless of the robot 1 being the single arm or dual arm, and regardless of the number of robots 1, any of the base hands 5A can grip the grip 81 of the extended hand 5B. That is, the extended hand 5B can be shared by the plurality of robotic arms 10. Thus, the replacement and shift of the robot 1 become easy. Further, since the robot manufacturer just provides the robot 1 having the common base hands 5A, the versatility of the robot 1 increases and the robot 1 can be provided by lease.

Moreover, in the manufacturing system according to the embodiment described above, the work station 2 has the base 20 which supports the extended hand 5B, and the base 20 has at least one connector receiving part 321 which receives the jointing part of the wiring and/or piping 33 connected with the robot 1. This connector receiving part 321 is electrically connected with the extended hand 5B. The work station 2 has the plurality of bases 20, and the connector receiving parts 321 of the bases 20 have the common form.

Thus, the jointing part of the wiring and/or piping 33 connected with the robot 1 is joinable to any of the connector receiving parts 321 of the bases 20. Moreover, the connector receiving part 321 of a certain base 20 is also joinable to any of the jointing parts of the wiring and/or piping 33 connected with the robot 1. Therefore, the construction of the manufacturing system becomes easy.

Note that, although an assumption of the work station 2 being newly installed in the production facility is described, the work station 2 can also be constructed using the existing equipment and instruments which are provided in the production facility.

For example, if there are the existing equipment and instruments in the production facility, the work station 2 can also be constructed using these equipment and instruments. In this case, in the step for acquiring the base 20 and the instrument (Step S3) of the method of constructing the manufacturing system, at least one of the acquiring base 20 and instrument may be the existing equipment and instrument. Typically, the instrument newly introduced into such a work station 2 is the extended hand 5B having the grip 81, peripheral equipment thereof (e.g., the operational input device 53, the instrument control device 54, the mode selecting device 59, etc.), and the wiring and piping, etc.

Thus, by constructing the work station 2 using the existing equipment and instrument, the introducing cost of the manufacturing system is reduced, a period required for the construction of the manufacturing system is shortened and, further, an installation space for the new work station 2 is unnecessary. Therefore, the introduction of the manufacturing system becomes easier.

Moreover, in the manufacturing system constructed as described above, when the robot 1 becomes unnecessary due to a fall of demand, a change of the product, etc. and the robot 1 is returned and the manufacturing system is disassembled, but the work station 2 (i.e., equipment and instrument which constitute the work station 2) can be continuously used as a work station for the worker to work as it is. That is, even if it becomes a situation where the manufacturing system cannot be continued, the work station 2 remains as a user's useful property.

Although the suitable embodiment of the present disclosure is described above, the structure may be changed as follows, for example.

For example, in the embodiment described above, the base hand 5A of the end effector 5 is the gripper-type hand provided with the pair of grip fingers 72 driven by the air cylinder. Note that the grip finger 72 may have joint(s), or three or more grip fingers 72 are provided, as long as the base hand 5A is the robot hand which can grip or release the object. For example, as the base hand 5A, an angle opening-and-closing gripper-type hand having a pair of rotating fingers, a gripper-type hand which grips the object with three or more fingers, a chuck-type hand which restrains the object, etc. may be adopted.

Figure 33:
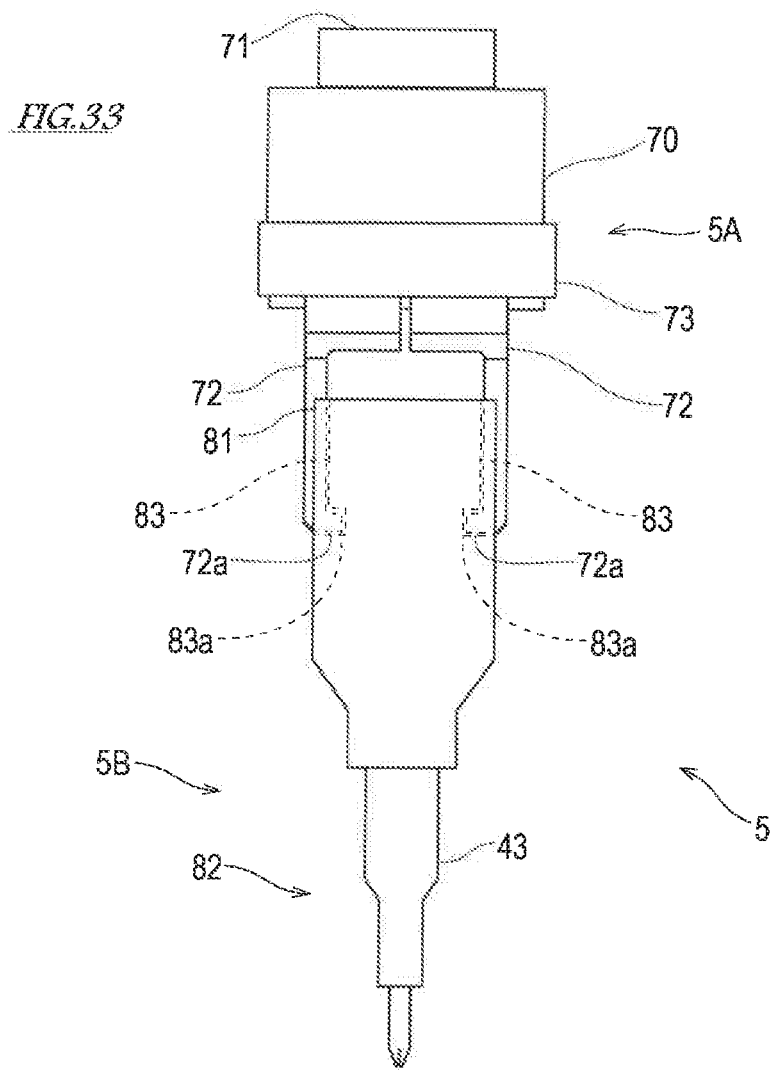
FIG. 33 is a side view illustrating Modification 1 of the base hand of the end effector.

Moreover, the base hand 5A is not limited to what grips the grip 81 of the extended hand 5B from side ways. For example, as illustrated in FIG. 33, the pair of grip fingers 72 of the base hand 5A of the end effector 5 may be suspended downwardly from a platform 70. In this case, the engaging parts 83 may include two grooves which are symmetrically provided through the axial center of the grip 81 and which extend parallel to the axial center directions in the outer circumferential surface of the grip 81, with a groove width into which the grip fingers 72 fits. Further, hooks 72a may be provided to the pair of grip fingers 72 of the base hand 5A, and a concave part 83a into which the hook 72a fits may be formed in the inside of at least one of the two grooves which are the engaging parts 83 formed in the grip 81. Thus, by the hook 72a fitting into the concave part 83a, the base hand 5A and the extended hand 5B can be positioned in the axial center directions.

Figure 34:
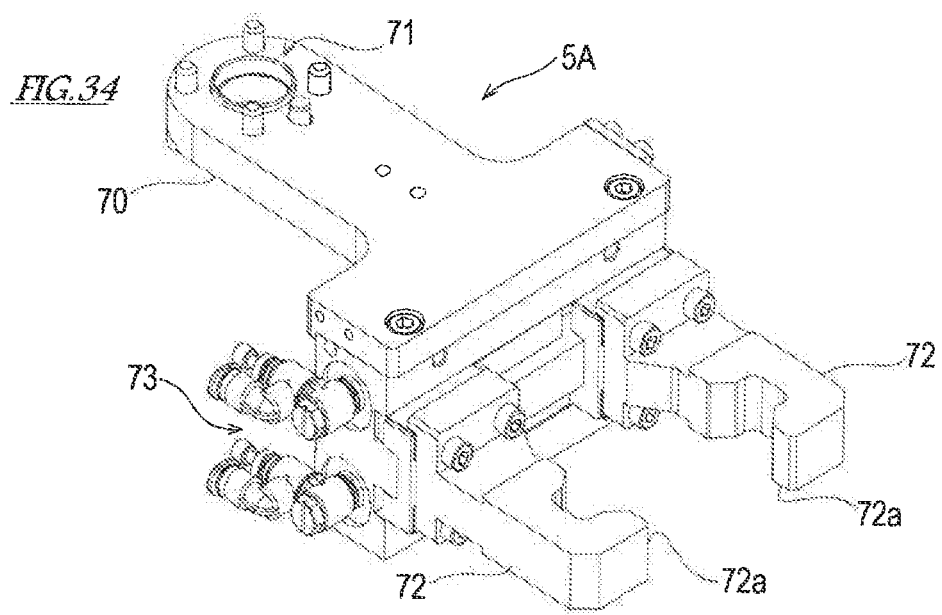
FIG. 34 is a side view illustrating Modification 2 of the base hand of the end effector.

Moreover, the form of the grip fingers 72 of the base hand 5A is not limited to this embodiment, and if the engaging parts 83 corresponding to the form of the grip fingers 72 of the base hand 5A are formed in the grip 81 of the extended hand 5B, for example, as illustrated in FIG. 34, at least one hook (convex part) may be formed in the opposing surfaces of the pair of grip fingers 72 of the base hand 5A. In this case, a receiving part (e.g., concave part) which receives the hook of the grip finger 72 of the base hand 5A is formed in the grip 81 of the extended hand 5B.

Figure 35:
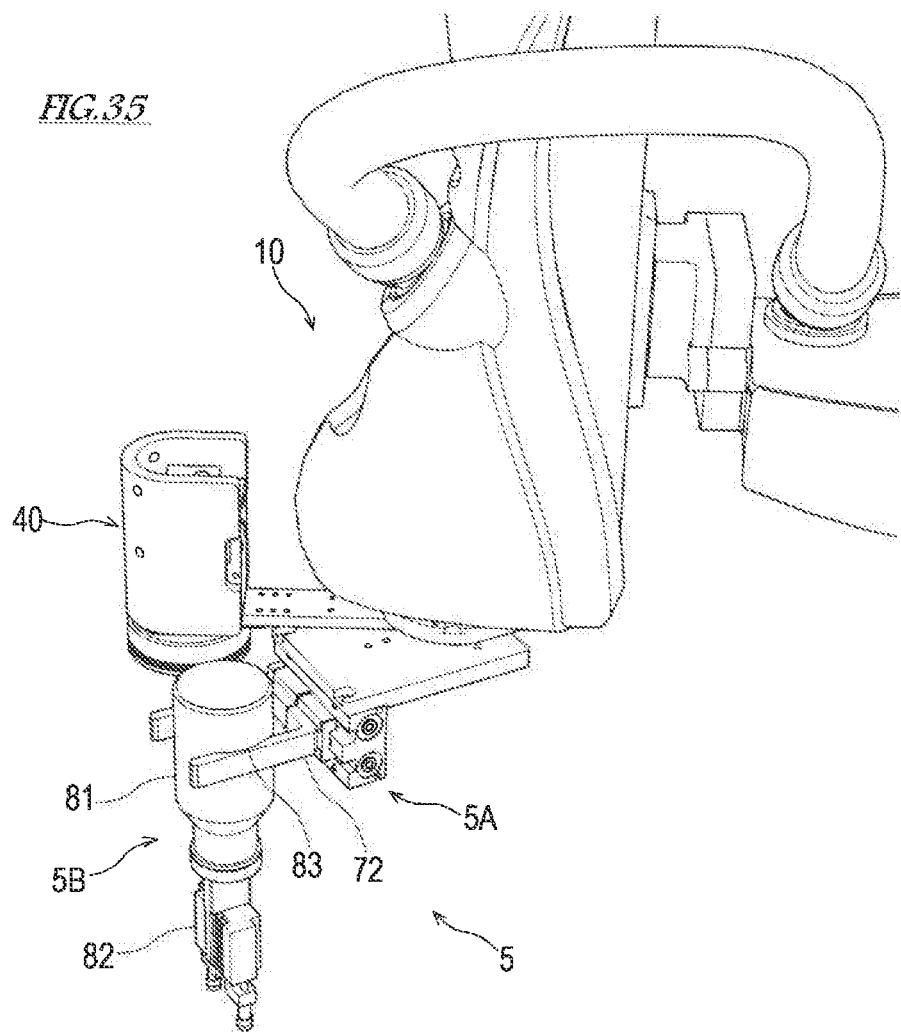
FIG. 35 is a side view illustrating Modification 1 of the grip of the extended hand.

Moreover, for example, in the embodiment described above, although the grip 81 of the extended hand 5B presents the cylindrical shape, the shape of the grip 81 is not limited to this shape. For example, as illustrated in FIG. 35, the grip 81 of the extended hand 5B may present a cylindrical shape. Also in this grip 81, the groove-like engaging parts 83 which receive the grip fingers 72 of the base hand 5A are formed in the circumferential surface of the grip 81 of cylindrical shape.

Figure 36:
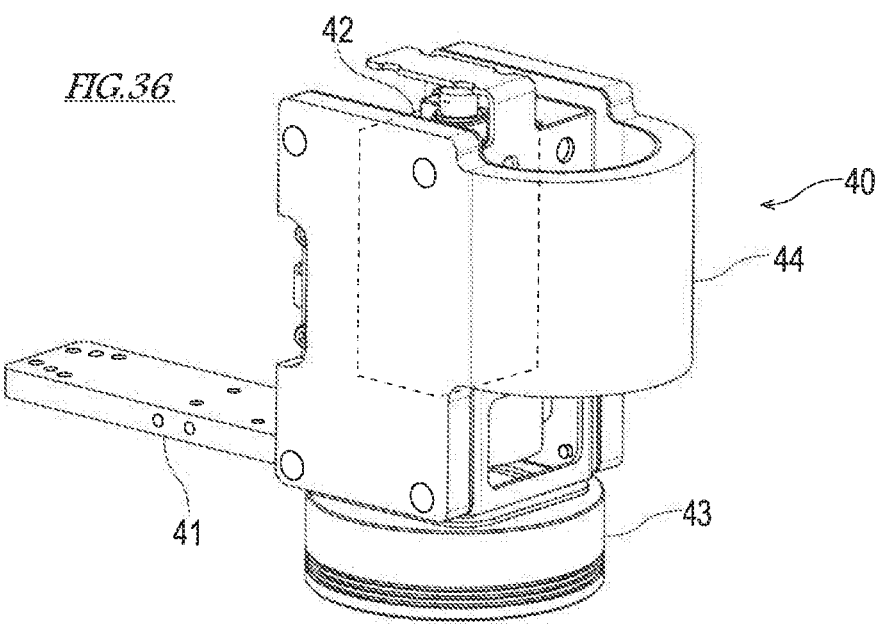
FIG. 36 is a perspective view of a hand-eye device provided to a hand part of the robotic arm.

Note that a hand-eye device 40 provided to the hand part of the arm 10 is illustrated in FIG. 35. FIG. 36 is a perspective view of the hand-eye device 40 provided to the hand part of the arm 10. As illustrated in FIGS. 35 and 36, the hand-eye device 40 includes a support plate 41 attached to the wrist part 13 of the robotic arm 10, a sponge covering 44 and lighting 43 in the support plate 41, and a camera 42 accommodated in the sponge covering 44. The sponge covering 44 also has a function as a harness guide.

The support plate 41 of the hand-eye device 40 may intervene between the mechanical interface 14 of the arm 10 and the robot interface 71 of the base hand 5A. Thus, with the hand-eye device 40 attached to the arm 10, a situation of the end effector 5 can be imaged immediately near the end effector 5.

The suitable embodiment (and modifications) of the present disclosure is described above. It is apparent for a person skilled in the art that many improvements and other embodiments of the present disclosure are possible from the above description. Therefore, the description is to be interpreted only as illustration, and it is provided in order to teach a person skilled in the art the best mode that implements the present disclosure. Details of the structures and/or the functions may substantially be changed without departing from the spirit of the present disclosure.

DESCRIPTION OF REFERENCE CHARACTERS

1: Industrial Robot
2: Work Station
5: End Effector
5A: Base Hand (Robot Hand)
5B: Extended Hand (One Example of Instrument)
6: Robot Control Device
10: Robotic Arm
13: Wrist Part
14: Mechanical Interface
20: Base
51: Negative Pressure Source
52: Electromagnetic Valve (One Example of Actuator)
53, 53a: Operational Input Device
54: Instrument Control Device
59: Mode Selecting Device
61: Air Source
62: Electromagnetic Valve
70: Platform
71: Robot Interface
72: Grip Finger
72a: Hook
73: Actuator
81: Grip
82: Functional Part
83: Engaging Part

What is claimed is:

1. An end effector to be attached to a wrist part of a robotic arm, the end effector comprising:
a robot hand to be coupled to the wrist part;
an instrument including:
a grip to be gripped by the robot hand or a worker; and
a functional part coupled to the grip,
wherein the grip presents a hollow or non-hollow cylindrical shape, and has in an outer circumferential surface thereof engaging parts with which fingers of the robot hand or worker's fingers engage.

2. The end effector of claim 1, wherein the robot hand has a pair of parallel fingers configured to approach to and separate from each other, and concavo-convex shapes are formed in opposing surfaces of the pair of fingers, and
wherein the engaging parts have a concavo-convex shape configured to mutually fit with the concavo-convex shapes formed in the pair of fingers.

3. The end effector of claim 1, wherein the robot hand has a pair of parallel fingers configured to approach to and separate from each other, and
wherein the engaging parts include grooves that is symmetrically formed through the axial center of the grip and which extend parallel to axial center directions in an outer circumferential surface of the grip with a groove width into which the fingers fit.

4. The end effector of claim 3, wherein the pair of fingers are provided with hooks, and
wherein a concave part into which the hook fits is formed in the groove.

5. A robot, comprising:
a robotic arm;
the end effector of claim 1 attached to the wrist part of the robotic arm; and
a robot control device configured to control operation of the robotic arm and the end effector.

6. A robot comprising:
a robotic arm;
an end effector including a robot hand and an instrument, the robot hand being coupled to a wrist part of the robotic arm, the instrument including a grip and a functional part, the grip being gripped by the robot hand or a worker, the functional part being coupled to the grip and including at least one actuator mounted or attached to the instrument;
a robot control device configured to control operation of the robotic arm and the end effector;
an operational input device configured to receive an operational input from the worker with respect to the functional part; and
an instrument control device electrically connected with the at least one actuator, the operational input device, and the robot control device,
wherein the instrument control device electrically connects one selected from the operational input device and the robot control device with the at least one actuator.

7. The robot of claim 6, wherein a mode selecting device configured to input a selection instruction of an automatic mode and a manual mode is electrically connected with the instrument control device, and
wherein the instrument control device electrically connects the robot control device and the at least one actuator when the selection instruction of the automatic mode is inputted from the mode selecting device, and electrically connects the operational input device and the at least one actuator when the selection instruction of the manual mode is inputted from the mode selecting device.

8. The robot of claim 6, wherein the operational input device is a foot switch, a button switch provided to the grip, or a lever switch provided to the grip.

9. An end effector to be attached to a wrist part of a robotic arm, the end effector comprising:
- a robot hand to be coupled to the wrist part; and
- an instrument including
  - a grip to be gripped by the robot hand or a worker and a functional part coupled to the grip, wherein:
- the functional part includes at least one actuator mounted or attached to the instrument;
- at least one adsorption pad connected with the functional part through a negative pressure source and piping is provided; and
- the at least one actuator includes an electromagnetic valve provided to the piping.

10. An end effector to be attached to a wrist part of a robotic arm, the end effector comprising:
- a robot hand coupled to the wrist part; and
- an instrument including
  - a grip to be gripped by the robot hand or a worker and a functional part coupled to the grip, wherein:
- the functional part includes at least one actuator mounted or attached to the instrument;
- the functional part is provided with a rotating tool; and
- the at least one actuator includes an electric motor configured to drive the rotating tool.

11. A working method of an industrial robot provided with a robotic arm and a robot hand attached to the robotic arm, by using an instrument having a grip gripped by a worker, comprising the steps of:

connecting a control system of the instrument with a control system of the robot, the control system of the instrument being configured to be selectively connectable with one of an operational input device operated by the worker and the control system of the robot;

with the control system of the instrument and the control system of the robot connected to each other, operating the robotic arm and the robot hand to grip the grip of the instrument by the robot hand;

operating the robotic arm and the instrument while maintaining the gripping of the grip of the instrument by the robot hand to act the instrument on an object; and before the worker grips the grip and operates the instrument after the gripping of the grip of the instrument by the robot hand is canceled, canceling the connection between the control system of the instrument and the control system of the robot and connecting the control system of the instrument with the operational input device.

12. The working method of claim 11, further comprising canceling the gripping of the grip of the instrument by the robot hand and operating the robotic arm and the robot hand to act the robot hand on the object.

* * * * *